United States Patent
Azimi et al.

(10) Patent No.: US 11,861,062 B2
(45) Date of Patent: Jan. 2, 2024

(54) BLINK-BASED CALIBRATION OF AN OPTICAL SEE-THROUGH HEAD-MOUNTED DISPLAY

(71) Applicant: The Johns Hopkins University, Baltimore, MD (US)

(72) Inventors: Ehsan Azimi, Baltimore, MD (US); Long Qian, Baltimore, MD (US); Peter Kazanzides, Lutherville, MD (US); Nassir Navab, Fairfax, VA (US)

(73) Assignee: The Johns Hopkins University, Baltimore, MD (US)

(*) Notice: Subject to any disclaimer, the term of this patent is extended or adjusted under 35 U.S.C. 154(b) by 6 days.

(21) Appl. No.: 15/733,453

(22) PCT Filed: Jan. 31, 2019

(86) PCT No.: PCT/US2019/016000
§ 371 (c)(1),
(2) Date: Jul. 31, 2020

(87) PCT Pub. No.: WO2019/152619
PCT Pub. Date: Aug. 8, 2019

(65) Prior Publication Data
US 2020/0363867 A1 Nov. 19, 2020

Related U.S. Application Data

(60) Provisional application No. 62/625,978, filed on Feb. 3, 2018.

(51) Int. Cl.
*G09G 5/00* (2006.01)
*G06F 3/01* (2006.01)
(Continued)

(52) U.S. Cl.
CPC .......... *G06F 3/013* (2013.01); *G02B 27/0179* (2013.01); *H04N 13/327* (2018.05);
(Continued)

(58) Field of Classification Search
CPC .... G06F 3/013; H04N 13/327; H04N 13/332; H04N 13/366
(Continued)

(56) References Cited

U.S. PATENT DOCUMENTS 5,689,619 A 11/1997 Smyth
7,369,101 B2 5/2008 Sauer et al.
(Continued)

FOREIGN PATENT DOCUMENTS

WO 2016191043 A1 12/2016
WO 2016204914 A1 12/2016

OTHER PUBLICATIONS

Azuma et al., "Improving Static and Dynamic Registration in an Optical See-through HMD," SIGGRAPH '94: Proceedings of the 21st annual conference on Computer graphics and interactive techniques, Jul. 1994, pp. 197-204.
(Continued)

*Primary Examiner* — Jonathan M Blancha
(74) *Attorney, Agent, or Firm* — Harrity & Harrity, LLP

(57) ABSTRACT

A calibration platform may display, via an optical see-through head-mounted display (OST-HMD), a virtual image having at least one feature. The calibration platform may determine, based on information relating to a gaze of a user wearing the OST-HMD, that the user performed a voluntary eye blink to indicate that the at least one feature of the virtual image appears to the user to be aligned with at least one point on the three-dimensional real-world object. The calibration platform may record an alignment measurement based on a position of the at least one point on the three-
(Continued)

dimensional real-world object in a real-world coordinate system based on a time when the user performed the voluntary eye blink. Accordingly, the alignment measurement may be used to generate a function providing a mapping between three-dimensional points in the real-world coordinate system and corresponding points in a display space of the OST-HMD.

20 Claims, 14 Drawing Sheets

(51) Int. Cl.
*H04N 13/327* (2018.01)
*H04N 13/332* (2018.01)
*H04N 13/366* (2018.01)
*G02B 27/01* (2006.01)

(52) U.S. Cl.
CPC ......... *H04N 13/332* (2018.05); *H04N 13/366* (2018.05); *G02B 2027/0187* (2013.01)

(58) Field of Classification Search
USPC .............................................................. 345/8
See application file for complete search history.

(56) References Cited

U.S. PATENT DOCUMENTS

| | | | |
|---|---|---|---|
| 9,861,446 B2 | 1/2018 | Lang | |
| 2002/0113756 A1* | 8/2002 | Tuceryan | G02B 27/017 348/E13.052 |
| 2003/0227470 A1* | 12/2003 | Genc | G06F 3/017 345/633 |
| 2012/0081282 A1* | 4/2012 | Chin | G06F 3/011 345/156 |
| 2014/0146394 A1 | 5/2014 | Tout et al. | |
| 2014/0358010 A1* | 12/2014 | Battiwalla | A61B 5/4851 600/300 |
| 2016/0167672 A1* | 6/2016 | Krueger | G16H 40/63 340/576 |
| 2017/0262045 A1* | 9/2017 | Rouvinez | G06F 3/011 |
| 2017/0293356 A1* | 10/2017 | Khaderi | G02B 27/0172 |
| 2017/0330042 A1* | 11/2017 | Vaziri | H04N 5/332 |
| 2018/0004283 A1 | 1/2018 | Mathey-Owens et al. | |
| 2018/0122208 A1* | 5/2018 | Peyrard | G06F 3/013 |
| 2018/0125405 A1* | 5/2018 | Yamada | A61B 5/1103 |
| 2018/0239144 A1* | 8/2018 | Woods | A63F 13/25 |
| 2018/0292895 A1* | 10/2018 | Schluessler | G06F 3/013 |
| 2018/0300008 A1* | 10/2018 | Rasanen | G06F 3/04886 |

OTHER PUBLICATIONS

Figl et al., "A Fully Automated Calibration Method for an Optical See-Through Head-Mounted Operating Microscope With Variable Zoom and Focus," IEEE Transactions on Medical Imaging, Nov. 2005, pp. 1492-1499, vol. 24, No. 11.
Fuhrmann et al., "Fast Calibration for Augmented Reality," Jun. 1999, Vienna University of Technology, Vienna, Austria.
Fuhrmann et al., "Comprehensive Calibration and Registration Procedures for Augmented Reality," 2001, VRVis Competence Center for Virtual Reality and Visualization, Vienna, Austria.
Fuhrmann et al., "Practical Calibration Procedures for Augmented Reality," Virtual Environments, 2000, Vienna University of Technology, Vienna, Austria.
Gao et al., "Easy Calibration of a Head-Mounted Projective Display for Augmented Reality Systems," IEEE Virtual Reality, 2003.
Genc et al., "Optical See-Through HMD Calibration: A Stereo Method Validated with a Video See-Through System," IEEE, 2000, pp. 165-174.
Genc et al., "Practical Solutions for Calibration of Optical See-Through Devices," Siemens Corporate Research, May 24, 2002.
Grubert et al., "A Survey of Calibration Methods for Optical See-Through Head-Mounted Displays," IEEE Transactions on Visualization and Computer Graphics, Sep. 2017, vol. 24, No. 9.
Hua et al., "Calibration of a Head-Mounted Projective Display for Augmented Reality Systems," International Symposium on Mixed and Augmented Reality, 2002.
Hua et al., "Calibration of an HMPD-Based Augmented Reality System," IEEE Transactions on Systems, Man, and Cybernetics—Part A: Systems and Humans, May 2007, pp. 416-430, vol. 37, No. 3.
Itoh et al., "Performance and Sensitivity Analysis of INDICA : INteraction-Free Display CAlibration for Optical See-Through Head-Mounted Displays," IEEE International Symposium on Mixed and Augmented Reality, Sep. 2014, pp. 171-176.
Itoh et al., "Interaction-Free Calibration for Optical See-Through Head-Mounted Displays based on 3D Eye Localization," IEEE 3DUI, Mar. 2014, pp. 75-82.
Janin et al., "Calibration of Head-Mounted Displays for Augmented Reality Applications," IEEE Virtual Reality Annual International Symposium, Sep. 1993, pp. 246-255.
Krolak et al., "Eye-blink detection system for human-computer interaction," Univ Access Inf Soc (2012) 11:409-419.
Makibuchi et al., "Vision-Based Robust Calibration for Optical See-Through Head-Mounted Displays," IEEE International Conference on Image Processing, Sep. 2013, pp. 2177-2181.
McGarrity et al., "A Method for Calibrating See-through Head-mounted Displays for AR," IEEE 2nd International Workshop on Augmented Reality, Oct. 1999, San Francisco, CA.
Navab et al., "An On-line Evaluation System for Optical See-through Augmented Reality," IEEE Virtual Reality, Mar. 2004, pp. 245-246, Chicago, IL.
Owen et al., "Display-Relative Calibration for Optical See-Through Head-Mounted Displays," IEEE and ACM International Symposium on Mixed and Augmented Reality, 2004.
Tuceryan et al., "Single point active alignment method (SPAAM) for optical see-through HMD calibration for augmented reality," Presence: Teleoperators and Virtual Environments, Jun. 2002, vol. 11, Issue 3, pp. 259-276.
Tuceryan et al., "Single point active alignment method (SPAAM) for optical see-through HMD calibration for AR," 2000, pp. 1-10.
Zhou, Ji, "Calibration of Optical See Through Head Mounted Displays for Augmented Reality," 2007, Department of Computer Science and Engineering, Michigan State University.
Itoh, Yuta, "Calibration and Use of Optical See-Through Head-Mounted Displays towards Indistinguishable Augmented Reality," 2015, Technical Univeristy of Munich Dissertation, 70 Pages.

\* cited by examiner

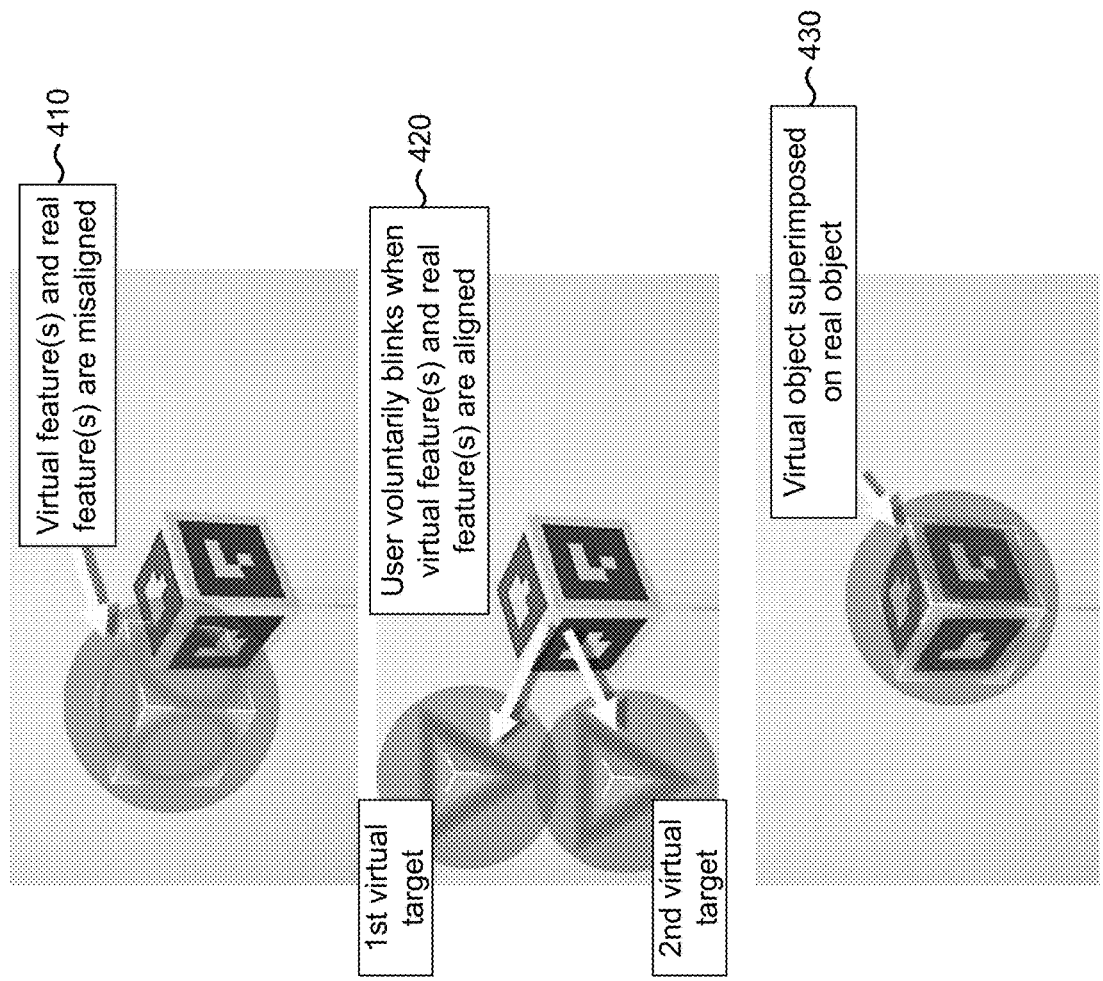

BLINK-BASED CALIBRATION OF AN OPTICAL SEE-THROUGH HEAD-MOUNTED DISPLAY

CROSS-REFERENCE TO RELATED APPLICATIONS

This application is a 371 national stage of PCT Application PCT/US2019/016000 filed on Jan. 31, 2019, entitled "BLINK-BASED CALIBRATION OF AN OPTICAL SEE-THROUGH HEAD-MOUNTED DISPLAY," which claims priority to U.S. Provisional Patent Application No. 62/625,978, filed on Feb. 3, 2018, both of which are hereby expressly incorporated by reference herein.

BACKGROUND

An optical head-mounted display, sometimes referred to as an optical see-through head-mounted display (OST-HMD), is a wearable device that can reflect projected images onto one or more screens while also allowing a user wearing the OST-HMD to see through the screen(s). For example, a typical OST-HMD uses an optical mixer made from partly silvered mirrors to reflect artificial (e.g., computer-generated) images and allow real images to cross the lens. Accordingly, OST-HMDs are increasingly being used for augmented reality and/or mixed reality applications. "Augmented reality" generally refers to interactive technologies in which objects in a real-world environment are "augmented" using computer-generated virtual content that may be overlaid on the real-world environment. "Mixed reality," sometimes referred to as "hybrid reality," similarly merges real and virtual worlds to produce a visual environment in which real physical objects and virtual digital objects can co-exist. However, in addition to overlaying virtual objects on the real-world environment, mixed reality applications often anchor the virtual objects to the real-world and allow users to interact with the virtual objects.

SUMMARY

According to some implementations, a method may comprise receiving information from a positional tracking device that relates to a position of at least one point on a three-dimensional real-world object, causing an optical see-through head-mounted display device to display a virtual image having at least one feature in a display space of the optical see-through head-mounted display device, and receiving information from an eye tracking device indicating that a user wearing the optical see-through head-mounted display device performed a voluntary eye blink, wherein the voluntary eye blink may comprise a calibration input to indicate that the at least one feature of the virtual image appears to the user to be aligned with the at least one point on the three-dimensional real-world object in the display space of the optical see-through head-mounted display device. In some implementations, the method may further comprise recording an alignment measurement based on the position of the at least one point on the three-dimensional real-world object in a real-world coordinate system based on a time when the user performed the voluntary eye blink, and generating a function providing a mapping between three-dimensional points in the real-world coordinate system and corresponding points in the display space of the optical see-through head-mounted display device based on the alignment measurement.

According to some implementations, a calibration device may comprise a memory and one or more processors communicatively coupled to the memory. In some implementations, the one or more processors may receive, from a positional tracking device, information that relates to three-dimensional real-world coordinates for a plurality of points on a three-dimensional real-world object, and cause an optical see-through head-mounted display device to display a virtual object having a plurality of features to be simultaneously aligned with the plurality of points on the three-dimensional real-world object from a perspective of a user wearing the optical see-through head-mounted display device. In some implementations, the one or more processors may be further configured to receive, from an eye tracking device, information indicating that the user wearing the optical see-through head-mounted display device performed a voluntary blink, wherein the voluntary blink may comprise a calibration input to indicate that the plurality of features of the virtual object appear to the user to be simultaneously aligned with the plurality of points on the three-dimensional real-world object from the perspective of the user. In some implementations, the one or more processors may record a plurality of alignment measurements based on the three-dimensional real-world coordinates for the plurality of points on the three-dimensional real-world object based on a time when the user performed the voluntary blink, and generate a function providing a mapping between the three-dimensional real-world coordinates and corresponding three-dimensional points in a display space of the optical see-through head-mounted display device based on the plurality of alignment measurements.

According to some implementations, a non-transitory computer-readable medium may store instructions comprising one or more instructions that, when executed by one or more processors, cause the one or more processors to receive, from a positional tracking device, information that relates to a position of at least one point on a three-dimensional real-world object; cause an optical see-through head-mounted display device to display a virtual image having at least one feature in a display space of the optical see-through head-mounted display device; receive, from an eye tracking device, information relating to a gaze of a user wearing the optical see-through head-mounted display device; determine, based on the information relating to the gaze of the user, that the user performed a voluntary eye blink to indicate that the at least one feature of the virtual image appears to the user to be aligned with the at least one point on the three-dimensional real-world object in the display space of the optical see-through head-mounted display device; record an alignment measurement based on the position of the at least one point on the three-dimensional real-world object in a real-world coordinate system based on a time when the user performed the voluntary eye blink; and generate a function providing a mapping between three-dimensional points in the real-world coordinate system and corresponding points in the display space of the optical see-through head-mounted display device based on the alignment measurement.

BRIEF DESCRIPTION OF THE DRAWINGS

FIGS. 1A-1B, 2A-2B, 3-4, 5A-5B, and 6-7 are diagrams of one or more example implementations described herein.

DETAILED DESCRIPTION

Figure 1A:
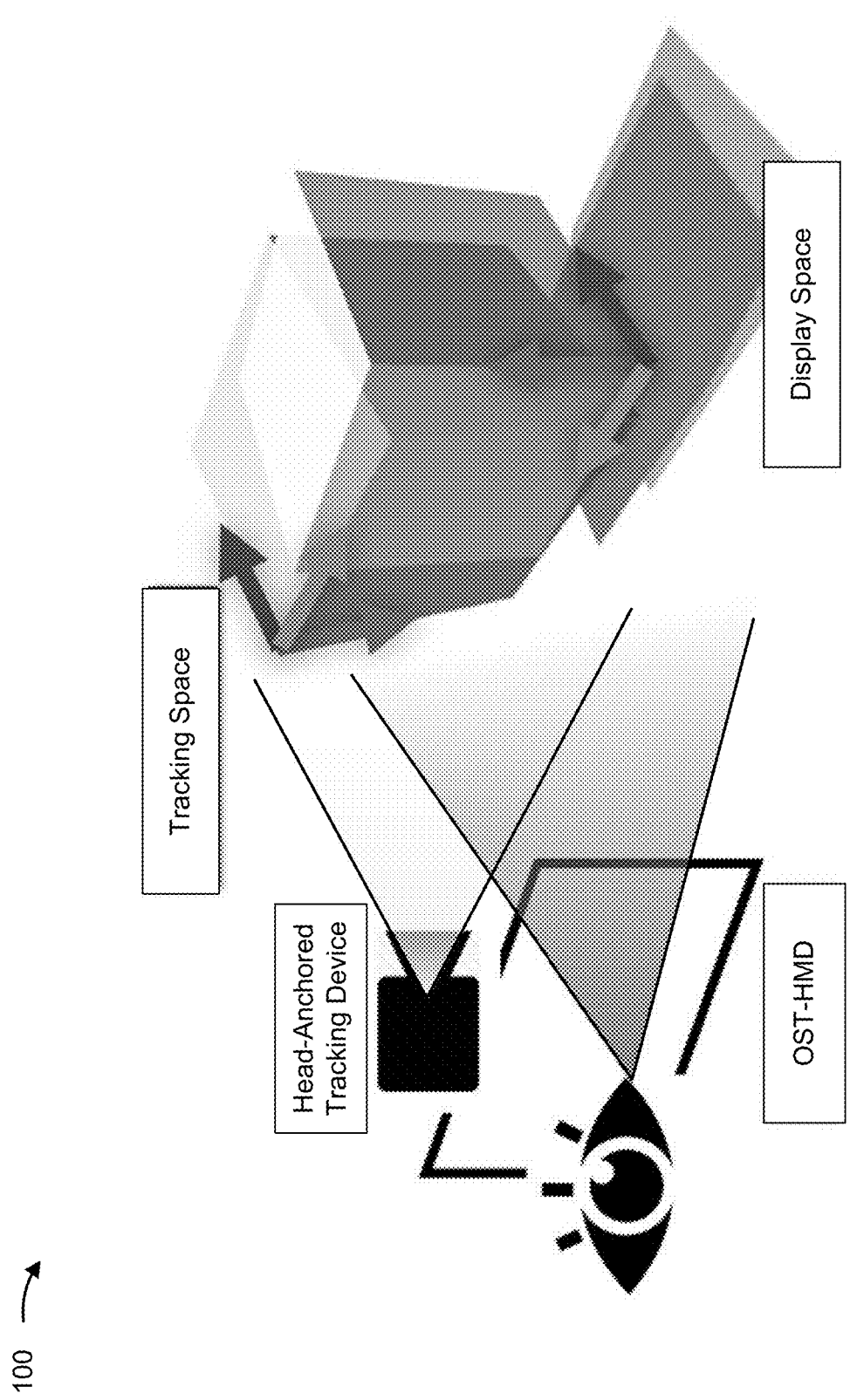

The following detailed description of example implementations refers to the accompanying drawings. The same reference numbers in different drawings may identify the same or similar elements.

The use of optical see-through head-mounted displays (OST-HMDs) for augmented reality and/or mixed reality applications has increased significantly in recent years. However, one particular area that has remained challenging for these systems is display calibration. For example, because augmented and mixed reality applications are designed to visualize virtual objects in a real-world environment, displaying the virtual objects according to a correct pose and alignment is important for proper user experience in augmented and/or mixed reality applications (e.g., surgical navigation). Proper calibration is also needed to correctly display virtual content anchored to the real-world in order to create a realistic augmented and/or mixed reality experience for other applications, such as training, gaming, and/or the like. However, existing methods intended to improve HMD calibration suffer from various drawbacks.

For example, OST-HMD calibration procedures are generally designed to compute a transformation function that allows virtual objects and real-world objects to be represented in a common coordinate system. One technique that can be used to compute such a transformation function is based on a Single-Point Active Alignment Method (SPAAM) in which a user wearing the OST-HMD is tasked with aligning a virtual feature (e.g., a crosshair) displayed on a screen of the OST-HMD with a corresponding real-world feature (e.g., a particular point on a real-world object). When the user is satisfied that the virtual feature and the corresponding real-world feature are aligned from a perspective of the user, the user confirms the alignment using some form of interaction. In order to produce a transformation function with reasonable accuracy, this alignment task is typically performed multiple times (e.g., until a threshold quantity of alignment measurements are obtained, a threshold quantity of repetitions are performed, and/or the like).

Existing methods for calibrating an OST-HMD tend to rely upon mouse clicks, button presses, hand motion, voice commands, and/or the like to register the interaction used to indicate that the virtual feature and the corresponding real-world feature are aligned from the perspective of the user. However, these input modalities suffer from lack of accuracy because the user has to redirect focus from the augmented and/or mixed reality to the input device used to register the interaction, which may lead to inaccurate alignment measurements due to subtle changes in position. Furthermore, even in the case of a speech command, generating the speech command may impart subtle vibrations, head and/or facial movements, and/or the like, which could undermine the accuracy of the alignment measurement. These input modalities also suffer from unnecessary external dependencies (e.g., input devices) and limited applicability (e.g., the user must be able to use one or both hands and/or produce recognizable speech). Consequently, in addition to decreasing accuracy, calibration methods that rely upon mouse clicks, button presses, hand motion, voice commands, and/or the like to register the interaction may decrease a target audience for OST-HMDs (e.g., by excluding individuals who may be unable to use their hands and/or produce voice commands, medical personnel working in sterile environments, users who are working with machinery, and/or the like).

Some implementations described herein relate to calibrating an OST-HMD according to an approach that uses a voluntary blink as an interaction mechanism for indicating that the virtual feature and the corresponding real-world feature are aligned from the perspective of the user. In some implementations, the voluntary blink can be used as the interaction mechanism in any suitable calibration procedure, which may include calibration procedures based on a Single-Point Active Alignment Method (SPAAM) technique, a Multi-Point Active Alignment Method (MPAAM) technique, a technique that provides a mapping between three-dimensional points in a real-world coordinate system and corresponding two-dimensional points on a screen of the OST-HMD, a technique that provides a mapping between three-dimensional points in a real-world coordinate system and three-dimensional points in a display space of the OST-HMD, and/or the like.

More particularly, in some implementations, the OST-HMD may include or be coupled to an eye tracking device that can track information related to a gaze of the user wearing the OST-HMD. Accordingly, the information related to the gaze of the user may be used to detect that the user performed a voluntary blink, which may be distinguished from spontaneous blinks or reflex blinks. For example, the voluntary blink may last a duration that satisfies a threshold value (e.g., longer than ~200 milliseconds based on an average blink lasting a duration of about 100-150 milliseconds). In another example, the voluntary blink may be detected based on the user closing one or more eyes in a given pattern (e.g., a double blink, multiple blinks that occur within a threshold time of one another, closing a left eye and then a right eye, and/or the like). In still another example, the voluntary blink may be detected using one or more machine learning models that can classify blink and/or gaze information as a voluntary blink, a spontaneous blink, or a reflex blink.

In this way, during the calibration procedure, the user does not have to use a hand, mouse, speech, and/or the like to register the interaction indicating that the virtual feature and the real feature are aligned, minimizing dependencies and/or externalities to only the eyes that can blink to register the interaction. Furthermore, in this way, the blink-based interaction may increase calibration accuracy by allowing the user to concentrate and focus attention on the alignment task, whereas existing methods that involve the user moving his or her hand, clicking a mouse, and/or performing other actions introduce error into the calibration. Moreover, because the blink-based interaction mechanism does not rely upon input devices, hand motion, and/or voice (i.e., the mere ability to blink suffices to perform the calibration), the blink-based interaction mechanism may significantly increase a potential OST-HMD target audience. For example, the blink-based interaction mechanism can be performed by individuals who cannot use their hands (e.g., disabled users, including stroke victims whose ability to move is limited to blinking), users who may not have hands (e.g., due to amputation or a birth defect), medical personnel who are working in a sterile environment and therefore cannot touch calibration objects and/or input devices, users involved in critical tasks working with machinery or doing maintenance, and/or the like.

Figure 1B:
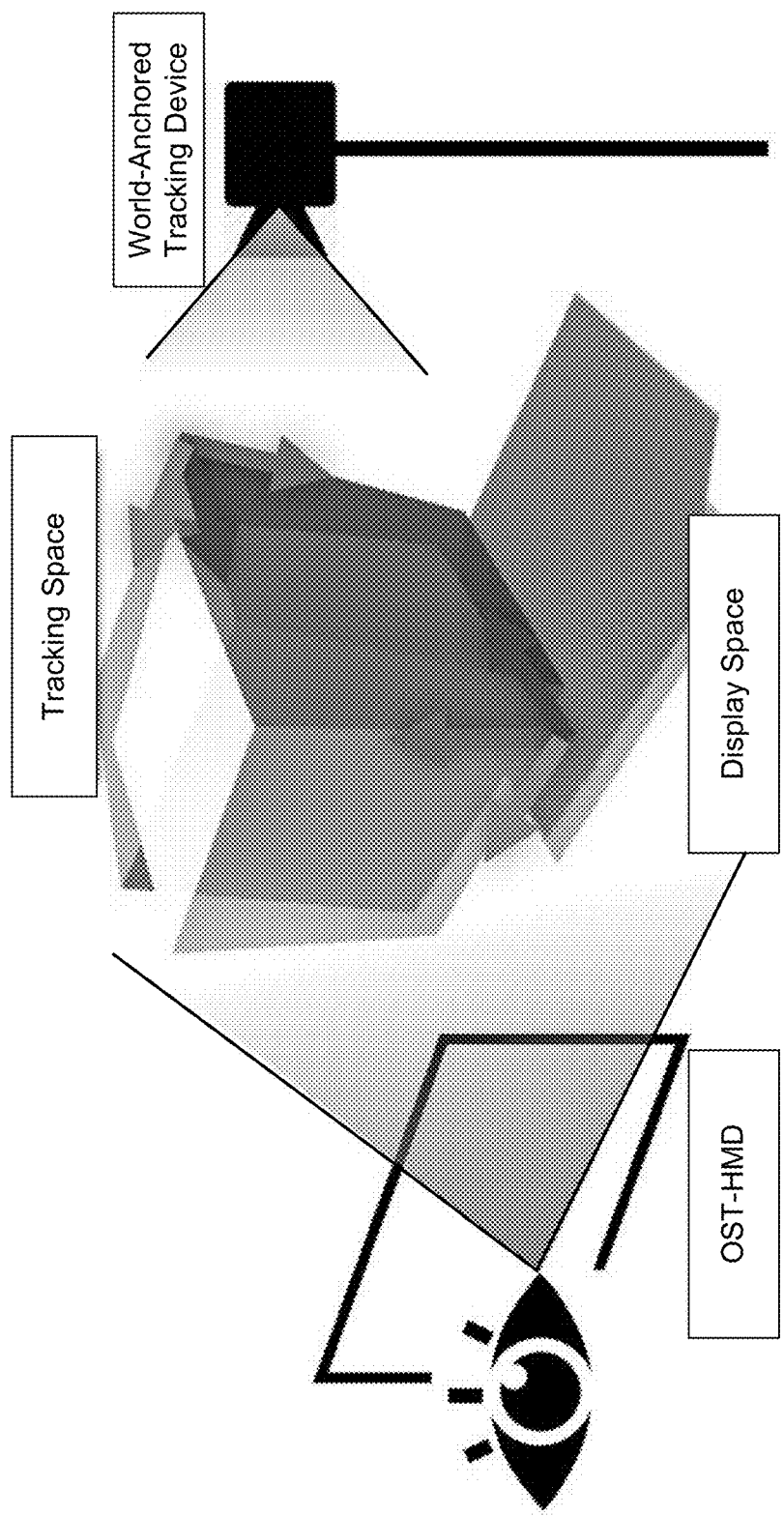

FIGS. 1A-1B are diagrams of one or more example implementations 100, 110 described herein. FIGS. 1A-1B show schematic views of misalignment between a tracking space (e.g., a real-world coordinate space tracked by a positional tracking device) and a display space (e.g., a display coordinate space in which an OST-HMD renders a three-dimensional virtual scene that may include one or more virtual objects). As mentioned above, because augmented and/or mixed reality applications are designed to visualize virtual objects in reality, a correct pose and alignment of the virtual objects to be rendered is important for a proper user experience. For example, if the OST-HMD in example implementations 100, 110 is not calibrated with the positional tracking device, the misalignment between the tracking space and the display space will cause an unrealistic and/or undesirable augmented and/or mixed reality experience. Accordingly, in some implementations, a calibration procedure may be used to compute a transformation function that enables the OST-HMD to represent virtual objects in the same coordinate system as real-world objects (e.g., by aligning the display coordinate space in which the OST-HMD renders the virtual objects with the real-world coordinate space tracked by the positional tracking device). For example, given a real-world cube and a virtual cube to be overlaid on the real-world cube, the transformation function may be used to move, warp, and/or otherwise adjust a rendering of the virtual cube such that the virtual cube and the real-world cube are aligned. In another example, given a real-world cup and a virtual lid to be placed on the real-world cup, the transformation function may be used to move, warp, or otherwise adjust the rendering of the virtual lid in the display space to remain aligned with the top of the real-world cup. Moreover, as described in further detail herein, the calibration procedure can be used to compute the transformation function using a head-anchored tracking device (e.g., as shown in FIG. 1A) and/or a world-anchored tracking device (e.g., as shown in FIG. 1).

As shown in FIG. 1A, example implementation 100 may include an OST-HMD (e.g., a stereoscopic OST-HMD) that can generate a three-dimensional image in the display space by presenting a pair of two-dimensional perspective images of a three-dimensional virtual scene (e.g., a first perspective image for a left eye and a second perspective image for a right eye). For example, in some implementations, the OST-HMD may present the pair of two-dimensional perspective images from two slightly different viewing positions using a left eye projection operator and a right eye projection operator.

As further shown in FIG. 1A, example implementation 100 may include a head-anchored tracking device that can perform "inside-out" positional tracking. For example, in some implementations, the head-anchored tracking device may be a front-facing camera embedded in the OST-HMD, a camera and/or other sensors rigidly mounted on the OST-HMD, and/or the like. In some implementations, the head-mounted tracking device may have a similar line of sight as the user wearing the OST-HMD and may generally track a position of the OST-HMD in a three-dimensional Euclidean tracking space. For example, when the OST-HMD moves, the head-mounted tracking device may readjust the tracked position of the OST-HMD (e.g., based on translational movements, changes in pitch, roll, and yaw, and/or the like).

In some implementations, the head-mounted tracking device may further track three-dimensional positions of real-world objects based on observed features of the surrounding environment using a marker-based tracking algorithm that offers simplicity and robustness, and/or a marker-free (or marker-less) tracking algorithm that offers better user experience. For example, when the marker-based tracking algorithm is used, real-world objects may have one or more fiducial markers (e.g., primitive shapes such as points, squares, circles, and/or the like) that are designed to be easily detected and serve as reference points for the head-mounted tracking device. Additionally, or alternatively, the head-mounted tracking device may perform inside-out positional tracking using infrared (IR) markers and a camera that is sensitive to IR light. When using the marker-free tracking algorithm, the head-mounted tracking device may use distinctive characteristics that originally exist in the real-world environment to determine position and orientation. Relative to a world-anchored tracking device, the head-mounted tracking device may have a reduced size, consume less power, and/or have a smaller computational cost.

As shown in FIG. 1B, example implementation 110 may also include an OST-HMD (e.g., a stereoscopic OST-HMD) that can generate a three-dimensional image by presenting a pair of perspective images of a three-dimensional scene from two slightly different viewing positions using a left eye projection operator and a right eye projection operator.

As further shown in FIG. 1B, example implementation 110 may include a world-anchored tracking device that can perform "outside-in" positional tracking. For example, in some implementations, the world-anchored tracking device may be a reflective marker tracking device, an electromagnetic sensing tracking device, a projective light-based tracking device, and/or the like. In the world-anchored tracking device, a tracking coordinate system may have a fixed pose with respect to a real-world coordinate system. Accordingly, in some implementations, the world-anchored tracking device may use spatial mapping capabilities associated with the OST-HMD (e.g., based on a simultaneous localization and mapping (SLAM) technique) to obtain a pose of the OST-HMD with respect to the world-anchored tracking device. Additionally, or alternatively, one or more markers (e.g., fiducial markers) may be attached to the OST-HMD and used to track the pose of the OST-HMD.

In some implementations, as noted above, the world-anchored tracking device may perform outside-in positional tracking to trace three-dimensional scene coordinates of real-world objects (e.g., the OST-HMD and/or other real-world objects in the surrounding environment). The world-anchored tracking device may include one or more cameras and/or other sensors that are placed in a stationary location and oriented towards the tracked real-world object(s) that are allowed to move freely around an area defined by intersecting visual ranges of the cameras. Like the head-anchored tracking device in implementation 100, the world-anchored tracking device may track real-world objects that have a set of markers (e.g., fiducial markers, infrared (IR) markers, and/or the like) and/or marker-free real-world objects. Relative to the head-anchored tracking device, the world-anchored tracking device can potentially be more accurate because the world-anchored tracking device may not have the same constraints as the head-anchored tracking device with respect to size, power consumption, computational resources, type of technology used, and/or the like. Furthermore, when the OST-HMD has self-localization and/or spatial mapping capabilities that can provide the pose of the OST-HMD, the world-anchored tracking device may be able to track real-world objects in the tracking space even when there is no direct line of sight from the camera of the OST-HMD to the tracked real-world objects.

In some implementations, as mentioned above, in implementations 100, 110, a calibration procedure may be used to compute a transformation function that enables the OST-HMD to represent virtual objects in the same coordinate system as real-world objects (e.g., by aligning the display space with the tracking space). For example, the transformation function may be computed using a set of measurements gathered using the head-anchored tracking device, the world-anchored tracking device, and/or the like. More particularly, the calibration procedure may use the set of measurements to compute a transformation function that provides a mapping between three-dimensional points in a real-world coordinate system (e.g., the tracking space) and corresponding points in a three-dimensional virtual environment (e.g., the display space). Accordingly, the transformation function may be applied to default internal projection operators that the OST-HMD uses to generate a three-dimensional image based on two-dimensional perspective images that are presented for each of the user's eye, resulting in corrected projection operators that effectively adjust the default internal projection operators to correct misalignments in visualizing virtual objects in the display space with respect to real-world objects in the tracking space.

As indicated above, FIGS. 1A-1B are provided merely as one or more examples. Other examples may differ from what is described with regard to FIGS. 1A-1B.

Figure 2A:
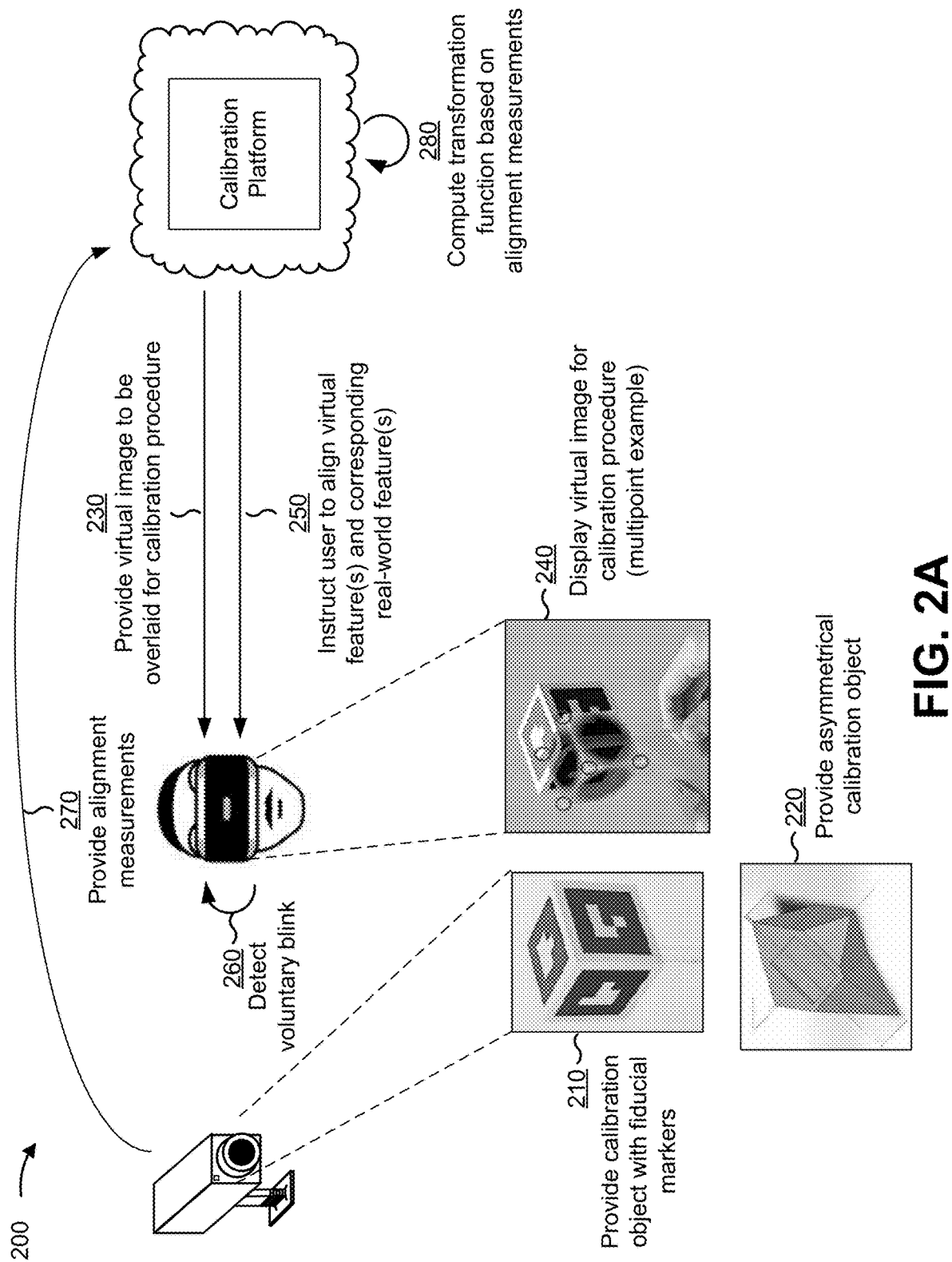
Figure 2B:
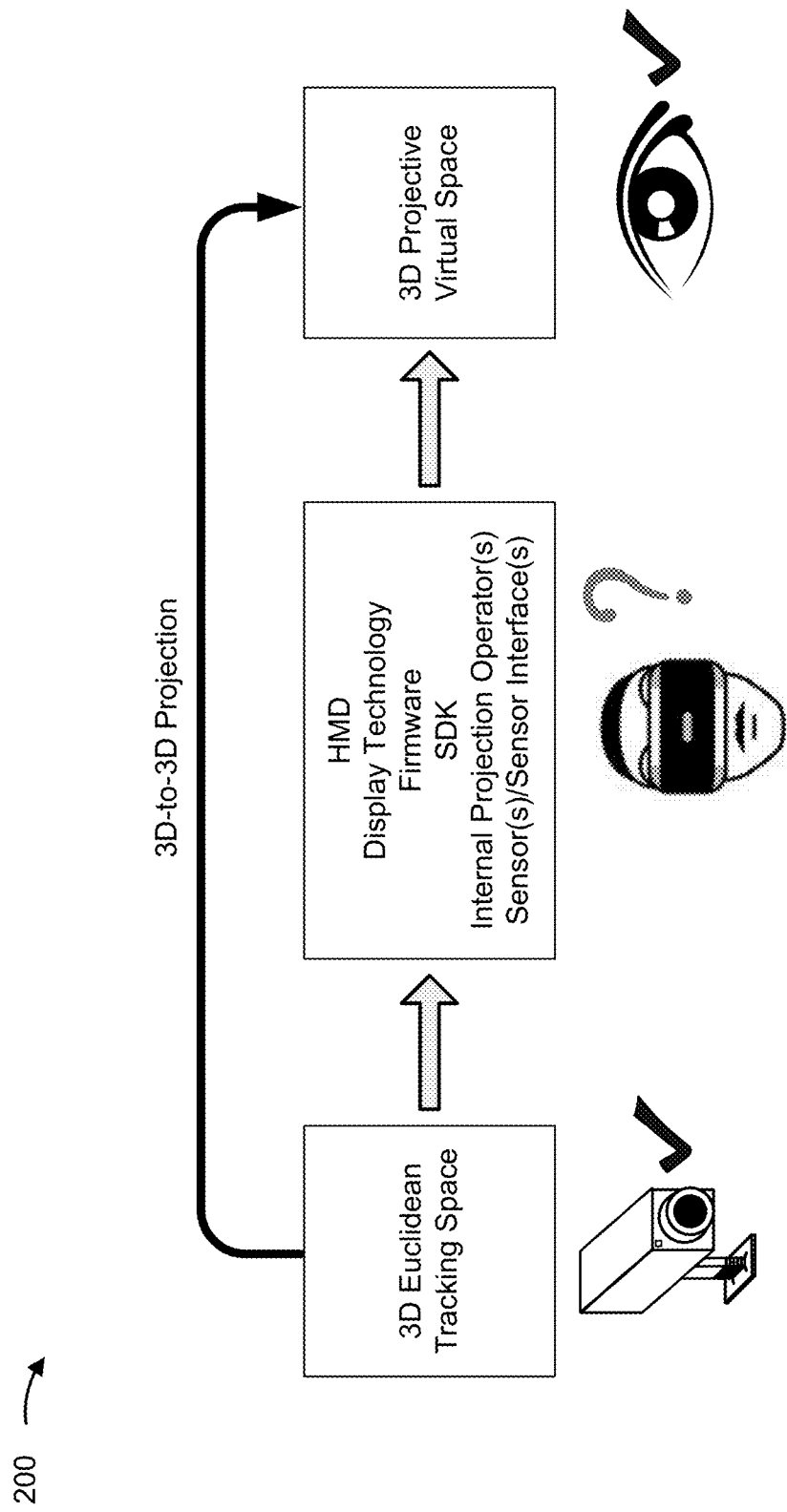

FIGS. 2A-2B are diagrams of one or more example implementations 200 described herein. More particularly, in implementation(s) 200, a calibration platform may perform a calibration procedure to solve a transformation function T(•) that provides a mapping between three-dimensional points in a real-world coordinate system tracked by a positional tracking device and corresponding points in a three-dimensional virtual scene visualized by an HMD (e.g., an OST-HMD) worn by a user. However, the calibration procedure described herein is for illustration purposes only. Accordingly, as noted above, the blink-based interaction mechanism can additionally, or alternatively, be used in other suitable calibration procedures, which may include calibration procedures based on a Single-Point Active Alignment Method (SPAAM) technique, a Multi-Point Active Alignment Method (MPAAM) technique, a technique that maps three-dimensional points in a real-world coordinate system to corresponding two-dimensional points on a screen of the OST-HMD, and/or the like.

For example, given the points $q_1, \ldots, q_n$ in the real-world coordinate system, the calibration platform may compute the transformation function T(•) to map the points $q_1, \ldots, q_n$ in the real-world coordinate system to corresponding points $p_1, \ldots, p_n$ in a display coordinate system as follows:

$$p_i = T(q_i)\ i=1, \ldots, n.$$

In some implementations, the calibration procedure may be performed based on an assumption that both $p_i$ and $q_i \varepsilon \mathbb{R}^3$ (e.g., $p_i$ and $q_i$ are both elements of a three-dimensional coordinate space). Accordingly, the calibration platform may estimate T based on a set of measurements (or observations) in the form of $(q_i, p_i)$ for $i=1, \ldots, n$. More specifically, the measurement of $q_i$ may be obtained using the positional tracking device, while $p_i$ is pre-defined and visualized on the OST-HMD worn by the user. Accordingly, with the calculated transformation function T(•), a point in the real-world coordinate system tracked by the positional tracking device can be mapped to a corresponding point in the display coordinate system. In this way, the transformation function may correct misalignments of real objects with virtual counterparts in the user's eyes such that virtual objects and real-world objects can be represented in a common coordinate system.

As shown in FIG. 2A, and by reference number 210, a calibration object with one or more fiducial markers may be given to a user wearing the OST-HMD. For example, in some implementations, the calibration object may be a cube with different fiducial markers attached on faces of the cube to aid the positional tracking device in tracking the real-world coordinates of the calibration object. Additionally, or alternatively, each face of the calibration object may have a different color to make an alignment task more intuitive. In some implementations, using a cube with fiducial markers and colored faces as the calibration object may provide the user with additional depth cues utilizing unique depth cue characteristics of three-dimensional visualization. As further shown in FIG. 2A, and by reference number 220, the calibration object provided to the user may additionally, or alternatively, be an asymmetrical calibration object. In this way, the asymmetrical calibration object may not have ambiguous corners (as in a cube), which may obviate a need to use different colors on the faces of the calibration object. In this way, the asymmetrical calibration object can be used in a monochromatic setting. Furthermore, the calibration object may have a stem and/or another suitable member to be held by the user, which may reduce the effects of poor alignment, hand tremor, and/or the like.

As shown in FIG. 2A, and by reference number 230, the calibration platform may provide, to the OST-HMD worn by the user, a virtual image to be overlaid on the calibration object for the calibration procedure. For example, the virtual image may be a three-dimensional virtual object that has the same shape as the calibration object and/or additional visual characteristics that aid the user in aligning the calibration object and the virtual object (e.g., colored faces that match the colored faces of the calibration object). Additionally, or alternatively, the virtual image may have a feature (e.g., a crosshair) that the user is tasked with aligning with one or more features on the calibration object. As shown in FIG. 2A, and by reference number 240, the OST-HMD may display the virtual image in a field of view of the user wearing the OST-HMD. In some implementations, the virtual image may be displayed in a location that is not correctly aligned with the calibration object. As shown in FIG. 2A, and by reference number 250, the calibration platform may instruct the user (e.g., via an automated voice command or screen prompt) to align one or more features of the virtual image with one or more corresponding features in the real-world (e.g., a corner, an edge, and/or another suitable feature of the calibration object).

In particular, the user may move the calibration object around in space, shift the user's head and/or body position, and/or the like until the user is satisfied that the calibration object and the virtual object are aligned in the user's view. For example, the implementation(s) 200 shown in FIG. 2A illustrate a multi-point alignment example in which the user is instructed to align multiple features (e.g., five corners) of the calibration object and multiple corresponding features of the virtual object. Additionally, or alternatively, the multi-point alignment example may instruct the user to align more than five points on the calibration object and the virtual object (e.g., the user could be instructed to align all seven corners of the cube that are visible). Additionally, or alternatively, the multi-point alignment example may instruct the user to align fewer than five points on the calibration object and the virtual object, as three (3) non-collinear and/or non-coplanar points in space are generally sufficient to fully determine a pose of a three-dimensional object. However, using more than three points (e.g., five in the illustrated example) may make the alignment task easier, provide the user with a better depth cue, and/or reduce a quantity of repetitions to be performed to obtain a threshold quantity of alignment measurements for computing the transformation function.

Additionally, or alternatively, implementation(s) 200 may utilize a single point alignment in which the user is instructed to align only one feature (e.g., one corner) of the calibration object and the virtual object. In this way, the positional tracking device may measure the three-dimensional position of only the one feature, which may reduce the burden associated with each alignment repetition. However, the single point alignment may need more repetitions to obtain the threshold quantity of alignment measurements, which can lead to inaccuracy due to user fatigue.

As shown in FIG. 2A, and by reference number 260, a voluntary blink may be detected using information obtained by an eye tracking device. More particularly, in some implementations, the eye tracking device may be integrated into or otherwise coupled to the OST-HMD in a location that enables the eye tracking device to obtain information relating to a gaze of the user. For example, the eye tracking device may include one or more projectors that can create a pattern of infrared or near-infrared light on the user's eyes and one or more cameras that capture high-resolution images of the user's eyes and the pattern created thereon. In some implementations, the eye tracking device may employ one or more algorithms (e.g., machine learning algorithms, image processing algorithms, mathematical algorithms, and/or the like) to determine a position and gaze point of the user's eyes. Furthermore, in some implementations, the high-resolution images of the user's eyes and the pattern created thereon may be used to detect one or more blinks based on the gaze information. The one or more blinks may be analyzed to determine whether the one or more blinks were voluntary (and thus reflect an intent to register an interaction indicating that the virtual and real-world objects are aligned) or instead a spontaneous blink or reflex blink.

For example, in some implementations, the one or more blinks may be determined to be voluntary based on the blink(s) lasting a duration and/or having a peak velocity that satisfies a threshold value (e.g., an amount of time and/or a velocity that is sufficiently longer and/or slower relative to spontaneous blinks and/or reflex blinks). In general, spontaneous blinks occur without any external stimuli and/or internal effort, while reflex blinks typically occur in response to external stimuli (e.g., tactile contact with a cornea, an eyelash, an eyelid, and eyebrow, and/or the like, optical stimuli such as a sudden bright light, loud noises and/or other auditory stimuli, and/or the like). Accordingly, voluntary blinks, spontaneous blinks, and reflex blinks may generally have different average durations, peak velocities, and/or other characteristics. Accordingly, in some implementations, the threshold value may be defined as a quantity of time longer than a typical duration of a spontaneous blink and/or a reflex blink, a peak velocity that is slower than a typical peak velocity of a spontaneous blink and/or a reflex, and/or the like.

Additionally, or alternatively, the one or more blinks may be determined to be voluntary based on a frequency of the blink(s) satisfying a threshold value. For example, in some implementations, a typical eye blink rate (EBR) and/or EBR associated with the specific user wearing the OST-HMD may be determined and a value of the EBR may be used to determine the threshold value. In this way, a double blink, a rapid succession of multiple blinks, and/or the like can be used to register the voluntary blink.

Additionally, or alternatively, the one or more blinks may be determined to be voluntary based on the one or more blinks occurring according to a given pattern (e.g., closing only one eye and subsequently closing only the other eye).

Additionally, or alternatively, the one or more blinks may be determined to be voluntary using one or more machine learning models that are trained to determine whether gaze information indicates that an eye blink is voluntary, spontaneous, or reflex. For example, blinking is an essential bodily function that all humans perform involuntarily to help spread tears across the eyes, remove irritants, keep the eyes lubricated, and/or the like. Accordingly, there may be various parameters (e.g., blink rate, blink speed or duration, blink patterns) that are similar across an entire population and/or specific to a given user or class of users. For example, blink rates, blink speeds, and/or the like can be affected by elements such as fatigue, eye injury, medication, disease, and/or the like.

Accordingly, in some implementations, the one or more machine learning models may take various parameters as input to classify one or more blinks as voluntary, spontaneous, or reflex blinks. For example, one input parameter may be a medication that the user wearing the OST-HMD is taking, which may affect the user's blink rate. In another example, because users may become fatigued after several repetitions performing the alignment task, one or more threshold values may be adjusted based on the number of alignment repetitions that the user has performed. In another example, the parameters input to the machine learning models may include information related to the virtual images shown to the user (e.g., to discard a blink that may occur if and/or when the virtual image is suddenly displayed in a manner that triggers a reflex blink). Accordingly, in some implementations, the one or more blinks may be appropriately classified as voluntary, spontaneous, or a reflex based on one or more parameters relating to the environment in which the alignment task is performed, the virtual images displayed via the OST-HMD, typical blink frequencies and/or durations for spontaneous and/or reflex blinks (e.g., for a population of users, the specific user wearing the OST-HMD, a category of users that includes the user wearing the OST-HMD, and/or the like), and/or the like.

As shown in FIG. 2A, and by reference number 270, the positional tracking device may provide one or more alignment measurements to the calibration platform based on the gaze information tracked by the eye tracking device indicating that the user performed the voluntary blink(s) to register an interaction indicating that the appropriate feature(s) on the calibration object and the virtual object appear to be aligned in the user's view. In some implementations, the virtual object may then appear in another location in the field of view of the user and the user may be instructed to perform the alignment task again. This process may be repeated until the threshold number of alignment measurements are obtained (e.g., ~20 measurements, which may be obtained in just four repetitions in the five-point alignment example). In some implementations, the virtual object may be displayed in a different location for each repetition, to cover as much of an area within the user's reach as possible. In this way, the alignment measurements used to compute the transformation function may be more balanced and less biased toward any given geometrical location.

As shown in FIG. 2A, and by reference number 280, the calibration platform may compute the transformation function based on the threshold quantity of alignment measurements provided by the positional tracking device. More specifically, as mentioned above, the calibration platform may estimate the transformation function (T) based on a set of measurements (or observations) in the form of $(q_i, p_i)$ for i=1, . . . , n, where the measurement of $q_i$ is a three-dimensional point obtained from the positional tracking device (e.g., a three-dimensional position of a point on the calibration object to be aligned with a corresponding point on the virtual object), while $p_i$ is pre-defined and visualized on the OST-HMD (e.g., a three-dimensional position at which the corresponding point on the virtual object is visualized).

In some implementations, the transformation function computed by the calibration platform may be a linear transformation function. For example, because the aim is to find a transformation between a three-dimensional coordinate system associated with the positional tracking device and a three-dimensional display coordinate system associated with a display space of the OST-HMD, the calibration platform may compute the transformation function as an affine transformation with 12 unknown parameters, as the transformation between coordinate systems is affine. Additionally, or alternatively, the calibration platform may solve for a general case where the transformation is a perspective transformation with 15 unknown parameters (excluding an arbitrary scale parameter). Additionally, or alternatively, because fewer unknown parameters require fewer calibration alignments and thus can considerably reduce the burden on the user, the calibration platform may compute the transformation function as an isometric transformation that has 6 unknown parameters.

For example, a 3D-to-3D rigid transformation may generally be represented as:

$$\hat{p}_i = [T]_{4 \times 4} \cdot \hat{q}_i$$

More specifically, the mathematical representation of the affine, perspective, and isometric transformations may be as follows:

i) Affine Transformation:

$$\hat{p}_i = [T_A]_{4 \times 4} \cdot \hat{q}_i, T_P = \begin{bmatrix} a_{11} & a_{12} & a_{13} & a_{14} \\ a_{21} & a_{22} & a_{23} & a_{24} \\ a_{31} & a_{32} & a_{33} & a_{34} \\ 0 & 0 & 0 & 1 \end{bmatrix}$$

where the first three rows of $T_A$ are arbitrary.

ii) Perspective Transformation:

$$\hat{p}_i = [T_P]_{4 \times 4} \cdot \hat{q}_i, T_P = \begin{bmatrix} p_{11} & p_{12} & p_{13} & p_{14} \\ p_{21} & p_{22} & p_{23} & p_{24} \\ p_{31} & p_{32} & p_{33} & p_{34} \\ p_{41} & p_{42} & p_{43} & p_{44} \end{bmatrix}$$

where both $\hat{p}_i$ and $\hat{q}_i$ are represented in normalized homogeneous coordinates and $T_P$ is an arbitrary 4×4 matrix with 15 unknown parameters (excluding an arbitrary scale).

iii) Isometric Transformation:

$$\hat{p}_i = [T_I]_{4 \times 4} \cdot \hat{q}_i, T_I = \begin{bmatrix} r_{11} & r_{12} & r_{13} & i_1 \\ r_{21} & r_{22} & r_{23} & i_2 \\ r_{31} & r_{32} & r_{33} & i_3 \\ 0 & 0 & 0 & 1 \end{bmatrix}$$

where $T_I$ is composed of a 3×3 orthonormal matrix $\{r_{i,j}\}$ representing rotation, and a 3×1 translational vector $\vec{1}$.

In some implementations, to solve the calibration problem, the calibration platform may compute a transformation function T that minimizes a reprojection error of the set of alignment measurements ($E_{reproj}$), which is represented as follows:

$$E_{reproj} = \frac{\sum_{i=1}^{n} \sqrt{(p_i - T(q_i))^2}}{n}$$

In some implementations, the calibration platform may calculate the affine transformation and/or the perspective transformation using a Direct Linear Transformation (DLT) algorithm, with an objective of minimizing a total algebraic error. For the isometric transformation, the problem is equal to registration of two rigid three-dimensional point sets, whereby an absolute orientation method may be used with an objective of minimizing a least-square error of the registration.

In some implementations, as mentioned above, the OST-HMD generates a three-dimensional image by presenting two two-dimensional perspective images, one for each eye, of a three-dimensional scene from two slightly different viewing positions. Each two-dimensional perspective image has a respective projection operator (P). In some implementations, the projection operator P may be represented by a 3×4 matrix and the OST-HMD may have a default configuration and preset internal projection matrices that can be represented as follows:

$[P_{LD}]_{3 \times 4}$,                                 Left Eye Default:

$[P_{RD}]_{3 \times 4}$                                  Right Eye Default:

In some implementations, the computed transformation, T, may be applied to each of the left eye default projection operator and the right eye default projection operator, which may result in the following effective left eye and right eye projection matrices in implementations where the projection operator P is represented by a 3×4 matrix:

$[P_{LE}]_{3 \times 4} = [P_{LD}]_{3 \times 4} \cdot [T]_{4 \times 4}$ $[P_{RE}]_{3 \times 4} = [P_{RD}]_{3 \times 4} \cdot [T]_{4 \times 4}$ Accordingly, the computed transformation, T, may effectively adjust the default internal projection operators used in the OST-HMD to correct misalignments in visualizing virtual objects with respect to a real scene. In other words, the computed elements in the effective projection operators may adjust an original or default calibration associated with the OST-HMD (e.g., with respect to aspect ratio, focal length, extrinsic transformation, and/or the like). In general, a 3×4 projection matrix contains eleven degrees of freedom (e.g., six for camera extrinsics and five for camera intrinsics). For stereo visualization, one common approach is to use the same projection matrix for both eyes, except with a translation (obtained using the interpupillary distance) along one coordinate direction, for a total of twelve degrees of freedom. Accordingly, while the different types of transformations (e.g., isometric, affine, and perspective) may all be 3D-3D transformations (i.e., each transformation takes a 3D point as an input and produces a 3D point as an output), the different types of transformations may vary in the number of degrees of freedom and the manner and/or extent to which the transformations can adjust the default projection matrices. For example, the isometric transformation is more constrained with six (6) parameters to estimate and maintains the dimensions (e.g., distances and angles) of the virtual objects to be displayed and merely changes the pose (e.g., the position and/or orientation) of the virtual objects. The affine transformation is less constrained than the isometric transformation with twelve (12) parameters to estimate and preserves parallel lines while warping (e.g., stretching and/or shearing) the shape of the virtual objects. The perspective transformation is the least constrained with fifteen (15) parameters to estimate and preserves collinearity, cross-ratio, order of points, and/or the like.

In some implementations, the calibration platform may analyze an error that results from each of the affine, perspective, and isometric transformations to determine which one represents a most accurate model. For example, because the alignment task is performed by a human user and thus is prone to error (e.g., because of fatigue due to having to perform multiple repetitions, hand tremor, and/or the like), a Random Sample Consensus (RANSAC) algorithm may be used to find the most accurate transformation and reject outliers based on the reprojection error $E_{reproj}$ of the set of measurements.

In some implementations, as shown in FIG. 2B, the calibration procedure may be performed independently of any internal features of the OST-HMD. For example, as shown in FIG. 2B, different OST-HMDs may use different display technologies, firmware packages, software development kits (SDKs), internal projection operators, and sensor configurations (e.g., built-in sensors, interfaces to external sensors, and/or the like). In particular, the calibration procedure may treat the OST-HMD like a blackbox, using data from a positional tracking system as an input and a visualization of a virtual three-dimensional object in the eyes of an observer (e.g., a user wearing the OST-HMD) as an output. For example, the OST-HMDs may enable the calibration platform to create a three-dimensional visualization of virtual content in a three-dimensional projective virtual space in front of the user's eyes and/or provide access to a final three-dimensional visualization of virtual content. Furthermore, the calibration platform may have access to the data gathered using the positional tracking device.

Accordingly, regardless of a level of access (if any) to internal settings associated with the OST-HMD, the calibration may use the three-dimensional representation of virtual content and the data gathered using the positional tracking device to compute a 3D-to-3D projection that corrects misalignments between real objects and virtual counterparts in the user's eyes (e.g., a 3D-to-3D projection from a three-dimensional Euclidean tracking space tracked by the positional tracking device to a three-dimensional projective virtual space perceived by the user). In this way, regardless of any intermediate processes used in the OST-HMD to create the virtual scene, the calibration procedure may correct the final alignment in the three-dimensional perceived scene, which is what matters for the user and affects the augmented and/or mixed reality experience. Accordingly, from this perspective, the projection computed by the calibration platform is from a three-dimensional real world to a three-dimensional space rather than two planar screens, whereby a mapping model used by the calibration platform becomes a 3D-3D registration procedure (e.g., representing information three-dimensionally in space rather than two-dimensionally within a screen coordinate system).

As indicated above, FIGS. 2A-2B are provided merely as one or more examples. Other examples may differ from what is described with regard to FIGS. 2A-2B.

Figure 3:
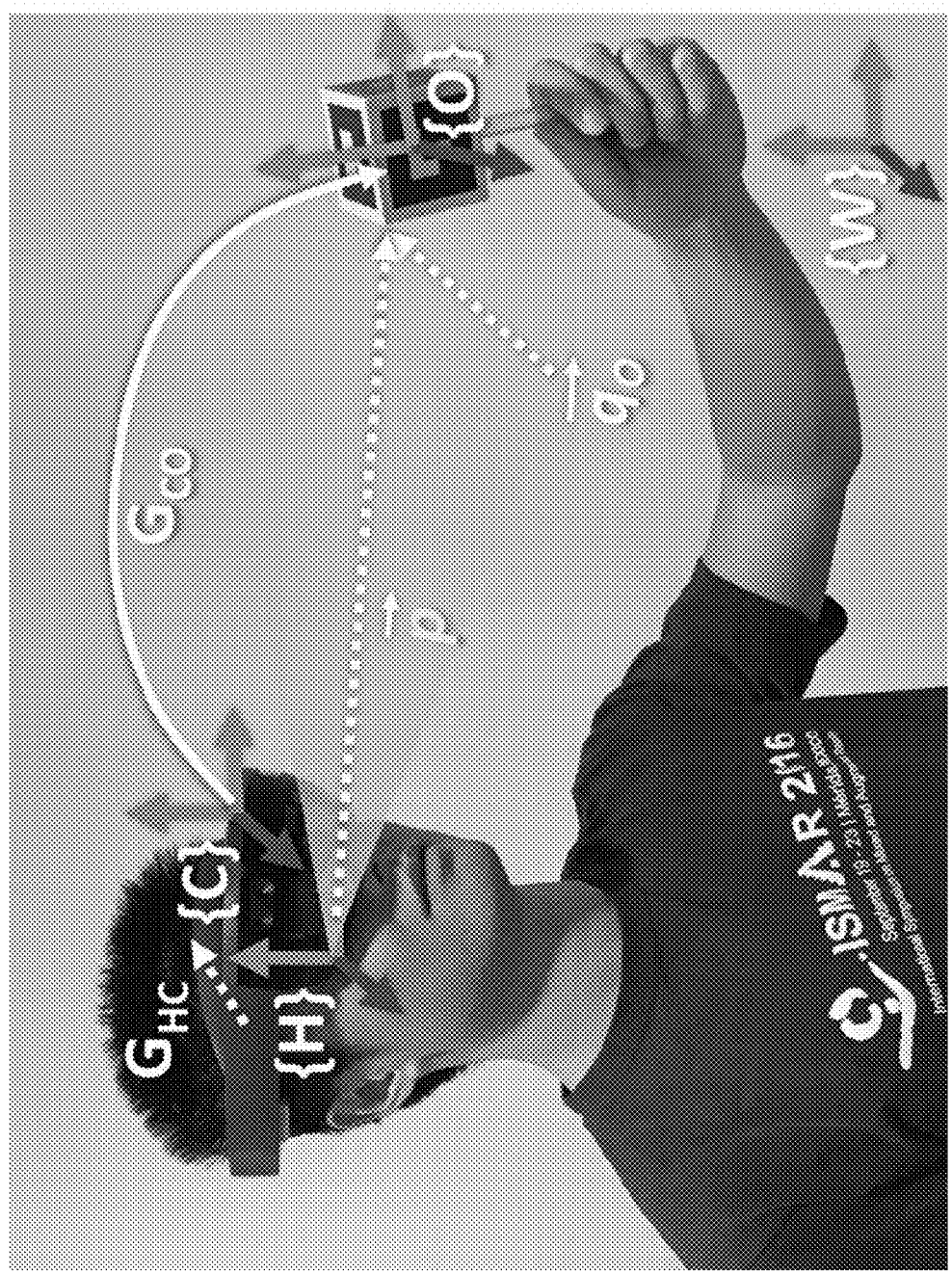

FIG. 3 is a diagram of an example implementation 300 described herein. FIG. 3 shows a setup for performing the calibration procedure described in further detail above with a head-anchored tracking device configured to perform inside-out positional tracking.

As shown in FIG. 3, implementation 300 may use a front-facing camera embedded in an HMD as the head-anchored tracking device. Additionally, or alternatively, the head-anchored tracking device may be a camera and/or other suitable positional tracking device that is rigidly mounted or otherwise fixed to the HMD. As shown in FIG. 3, a user wearing the HMD holds a real calibration object having one or more fiducial markers. As further shown in FIG. 3, coordinate systems of the positional tracking device (or camera), the calibration object, and the HMD are respectively represented as {C}, {O}, and {H}. Because the camera is fixed to the HMD, an extrinsic geometric transformation between the camera and the HMD ($G_{HC}$) is fixed. The point on the calibration object to be aligned with the virtual object is fixed at $\vec{q}_O$ with respect to the coordinate system of {O}. The corresponding point on the virtual object, visualized in the user's view, is at $\vec{p}$ in the coordinate system associated with the HMD {H}. In some implementations, the positional tracking device may determine a pose of the tracked object ($G_{CO}$), which may eventually yield point sets $\{q_i | q_i = G_{CO,i} \cdot \vec{q}_{o,i}, i=1, \ldots, n\}$ and $\{p_i | i=1, \ldots, n\}$ that can be used to compute the transformation function T, as described above. In some implementations, the pose of the tracked object ($G_{CO}$) that eventually yields the point sets may be determined based on a time when the user performs a voluntary blink to indicate that the points on the calibration object and the virtual object appear to be aligned in the user's view (e.g., within a threshold amount of time before and/or after the user performs the voluntary blink).

As indicated above, FIG. 3 is provided merely as one or more examples. Other examples may differ from what is described with regard to FIG. 3.

FIG. 4 is a diagram of an example implementation 400 described herein. FIG. 4 shows example views from a perspective of the user when the user is performing the calibration procedure described in further detail above with the head-anchored tracking device configured to perform inside-out positional tracking.

As shown in FIG. 4, and by reference number 410, the virtual object and the real calibration object may be misaligned in the user's view prior to calibration. As shown in FIG. 4, and by reference number 420, the user may be instructed to align one or more features (e.g., corner points) on the calibration object with one or more corresponding features on a virtual target. For example, a first virtual target may be displayed at a first location within the user's field of view. The user may move the calibration object around in space, move a head position and/or a body position, and/or the like until the user is satisfied that the real feature(s) on the calibration object are aligned with the corresponding feature(s) on the first virtual target. In some implementations, the user may perform a voluntary blink to indicate that the real feature(s) on the calibration object appear to be aligned with the corresponding feature(s) on the first virtual target within the user's view. The voluntary blink may be detected using information obtained by an eye tracking device that can track information relating to a gaze of the user. The head-mounted tracking device may provide a measurement indicating a three-dimensional position of the real feature(s) on the calibration object, which may be recorded along with the corresponding feature(s) on the first virtual target.

As further shown in FIG. 4, a second virtual target may then be displayed at a different location in the user's field of view and the user may again be instructed to align the one or more features on the calibration object with the second virtual target. This process may be repeated until a set of measurements having a threshold quantity of points have been collected (e.g., ~20 repetitions for ~20 measurements in a single point calibration procedure, ~4 repetitions for ~20 measurements in a five-point calibration procedure, and/or the like). In some implementations, the calibration platform may compute the transformation function based on the set of measurements, as described above. As shown in FIG. 4, and by reference number 430, the transformation function can be applied to internal projection operators that the HMD uses to present a two-dimensional image for each eye such that the virtual object is superimposed on the real calibration object.

As indicated above, FIG. 4 is provided merely as one or more examples. Other examples may differ from what is described with regard to FIG. 4.

Figure 5B:
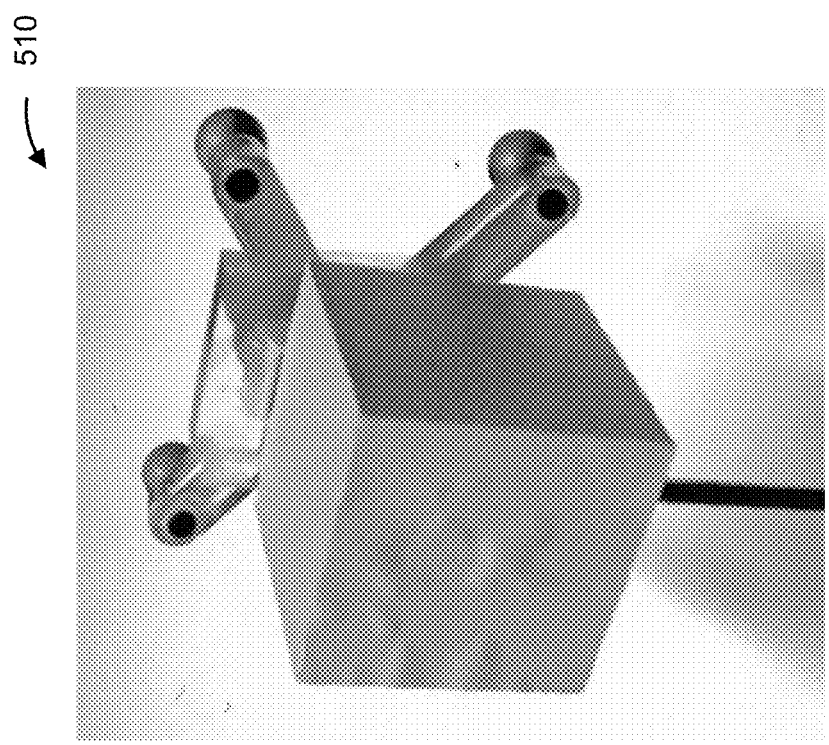
Figure 5A:
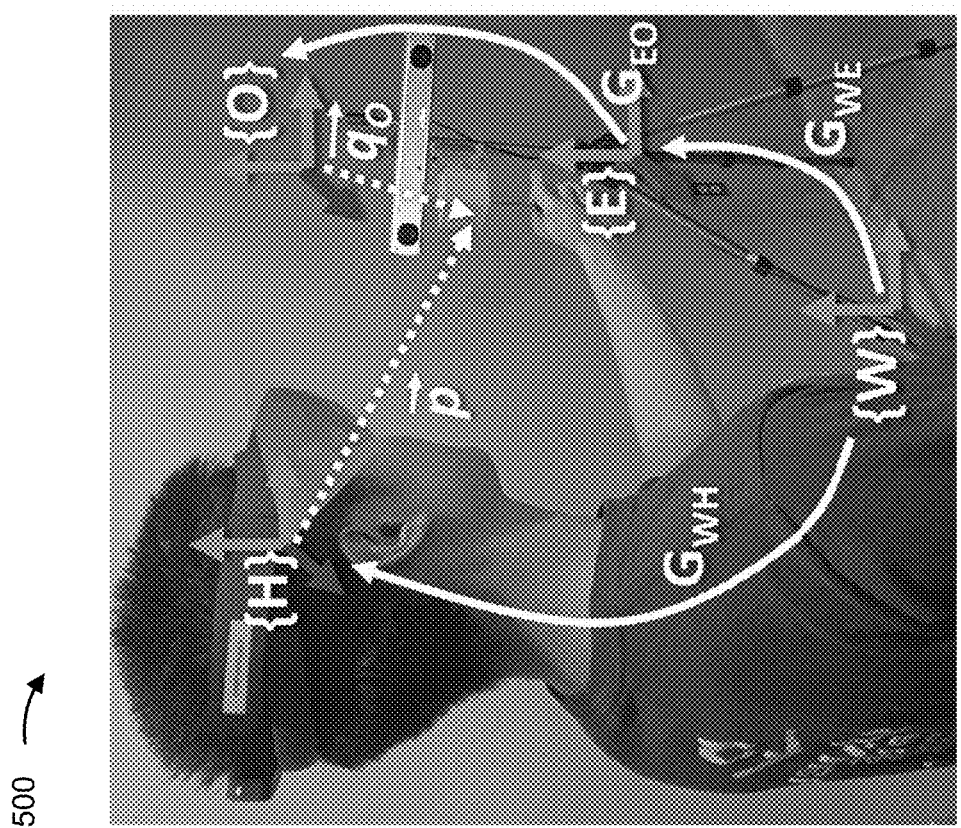

FIGS. 5A-5B are diagrams of one or more example implementations 500, 510 described herein. FIGS. 5A-5B show a setup for performing the calibration procedure described in further detail above with a world-anchored tracking device configured to perform outside-in positional tracking.

As shown in FIG. 5A, in implementation 500, coordinate systems associated with the world-anchored tracking device, the calibration object, the HMD, and the real-world may be respectively represented as $\{E\}$, $\{O\}$, $\{H\}$, and $\{W\}$. A difference between the setup using the head-anchored tracking device (e.g., as shown in FIG. 3) and implementation 500 is that the transformation $G_{HC}$ between the coordinate system of the head-anchored tracking device $\{C\}$ and the coordinate system of the MD $\{H\}$ is fixed, which is not the case for the world-anchored tracking device. Rather, for the world-anchored tracking device, the transformation $G_{HE}$ between the coordinate system of the world-anchored tracking device $\{E\}$ and the coordinate system of the HMD $\{H\}$ is expressed as $G_{HE}=G_{WH}^{-1} \cdot G_{WE}$. Because the world-anchored tracking device is stationary, and therefore does not change a pose within the environment, $G_{WE}$ is fixed. Therefore, the calibration platform may obtain an additional component to maintain and update the transformation $G_{WH}$ between the real-world and the HMD $\{H\}$ such that the transformation $G_{HE}$ between the positional tracking device and the HMD can be determined.

For example, in some implementations, a SLAM-based spatial mapping capability of the MD may be used to complete a transformation chain from the tracked calibration object to the user's view. In other words, the transformation from the world-anchored tracking device to the calibration object may be determined because the calibration object is tracked and the external world-anchored tracking device is fixed in the world. The spatial mapping capabilities may provide and update the pose of the HMD with respect to the world, which may close the transformation chain and permit the calibration platform to determine the pose of the calibration object relative to the UN/D. In this way, direct line of sight between the camera of the HMD and the calibration object is not needed, as long as the user can see the calibration object to perform the alignment task and the world-anchored tracking device remains in the same fixed position in the world. Accordingly, the HMD spatial mapping may not be reliant on the calibration object, but rather on self-localizing within the environment (e.g., with respect to large features such as walls). Alternatively, if the HMD does not have spatial mapping and/or self-localization capabilities, another method may be used to maintain and update the transformation $G_{WH}$ between the real-world and the HMD $\{H\}$ (e.g., using the world-anchored tracking device and mounting fiducial markers to also track the HMD). As shown in FIG. 5B, in implementation 510, the setup based on the world-anchored tracking device may use a calibration object attached to a frame composed from passive spherical markers. These spherical markers may be tracked by the world-anchored tracking device and used to determine the three-dimensional position of one or more points on the calibration object that are to be aligned with a virtual object. In some implementations, the three-dimensional position of the one or more points on the calibration object may be determined based on a time when the user performs a voluntary blink to indicate that the points on the calibration object and the corresponding points on the virtual object appear to be aligned in the user's view.

As indicated above, FIGS. 5A-5B are provided merely as one or more examples. Other examples may differ from what is described with regard to FIGS. 5A-5B.

Figure 6:
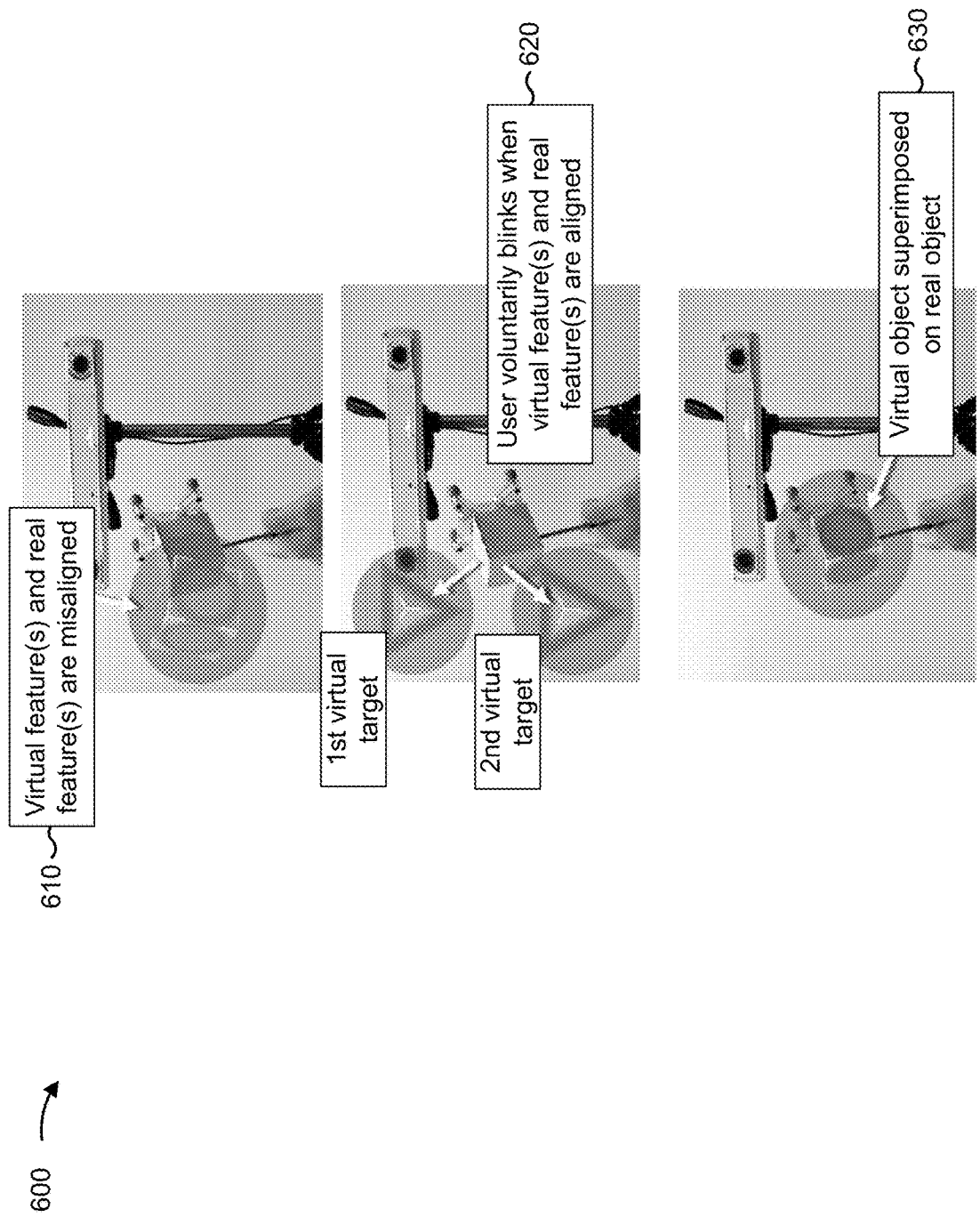

FIG. 6 is a diagram of an example implementation 600 described herein. FIG. 6 shows example views from a perspective of the user when the user is performing the calibration procedure described in further detail above with the world-anchored tracking device configured to perform outside-in positional tracking.

As shown in FIG. 6, and by reference number 610, the virtual object and the real calibration object may be misaligned in the user's view prior to calibration. As shown in FIG. 6, and by reference number 620, the user may be instructed to align one or more features (e.g., corner points) on the calibration object with one or more corresponding features on a virtual target. For example, a first virtual target may be displayed at a first location within the user's field of view. The user may move the calibration object around in space, move a head position and/or a body position, and/or the like until the user is satisfied that the real feature(s) on the calibration object are aligned with the corresponding feature(s) on the first virtual target. In some implementations, the user may perform a voluntary blink to indicate that the real feature(s) on the calibration object appear to be aligned with the corresponding feature(s) on the first virtual target within the user's view. The voluntary blink may be detected using information obtained by an eye tracking device that can track information relating to a gaze of the user. The head-mounted tracking device may provide a measurement indicating a three-dimensional position of the real feature(s) on the calibration object, which may be recorded along with the corresponding feature(s) on the first virtual target.

As further shown in FIG. 6, a second virtual target may then be displayed at a different location in the user's field of view and the user may again be instructed to align the one or more features on the calibration object with the second virtual target. This process may be repeated until a set of measurements having a threshold quantity of points have been collected (e.g., ~20 repetitions for ~20 measurements in a single point calibration procedure, ~4 repetitions for ~20 measurements in a five-point calibration procedure, and/or the like). In some implementations, the calibration platform may compute the transformation function based on the set of measurements, as described above. As shown in FIG. 6, and by reference number 630, the transformation function can be applied to internal projection operators that the HMD uses to present a two-dimensional image for each eye such that the virtual object is superimposed on the real calibration object.

As indicated above, FIG. 6 is provided merely as one or more examples. Other examples may differ from what is described with regard to FIG. 6.

Figure 7:
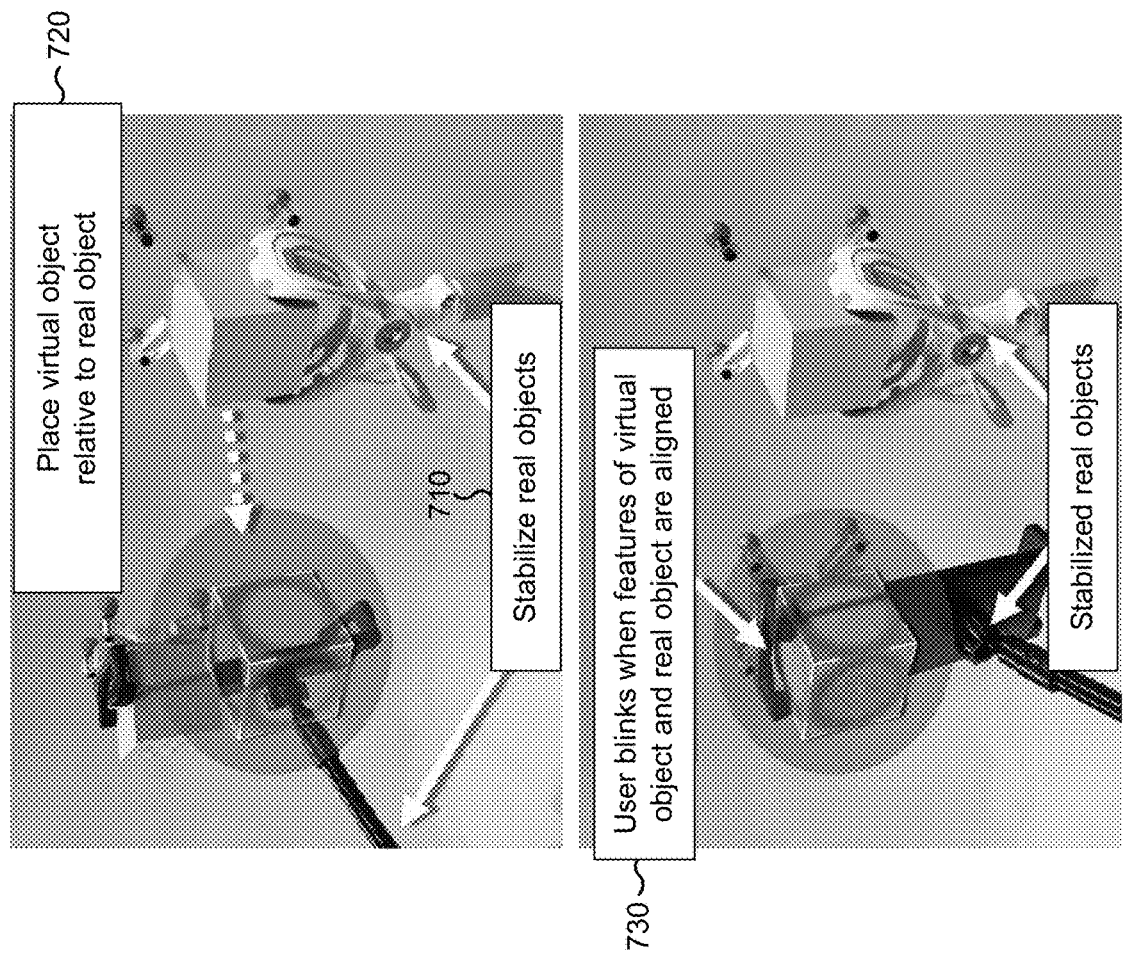

FIG. 7 is a diagram of an example implementation 700 described herein. FIG. 7 shows an example calibration setup that may be designed to reduce error that may be caused by poor alignment (e.g., due to hand tremor, user fatigue, and/or the like). Furthermore, the calibration setup shown in FIG. 7 may be used in combination with the blink-based interaction mechanism to provide a substantially hands-free calibration setup.

As shown in FIG. 7, and by reference number 710, the real calibration object(s) may be stabilized (e.g., by mounting or otherwise fixing the calibration object(s) to a rigid and/or flexible stand). In this way, the user does not have to hold the calibration object(s), which may reduce or eliminate error due to hand tremor. As further shown in FIG. 7, and by reference number 720, the virtual object may then be displayed relative to one or more of the real calibration objects. Accordingly, because the user is not holding the calibration object(s), the user may move around the real-world environment, shift a head and/or body position, and/or the like, and verify proper alignment from multiple viewpoints. In this way, more accurate and reliable alignment measurements may be obtained because the user is not holding the calibration object and possibly imparting small movements to the calibration object during alignment. Furthermore, in this way, a distance from the calibration object to the HMD is not limited by the user's arm length (e.g., allowing the virtual object to be placed at other three-dimensional locations that are not limited to the space within the user's reach). As shown in FIG. 7, and by reference number 730, the user may align the calibration object with the virtual object and perform a voluntary blink when the virtual object and the calibration object appear to be aligned in the user's view. In some implementations, based on the voluntary blink, the calibration platform may record the three-dimensional position of the point(s) on the real calibration object that are to be aligned with the corresponding point(s) on the virtual object.

As indicated above, FIG. 7 is provided merely as one or more examples. Other examples may differ from what is described with regard to FIG. 7.

Figure 8:
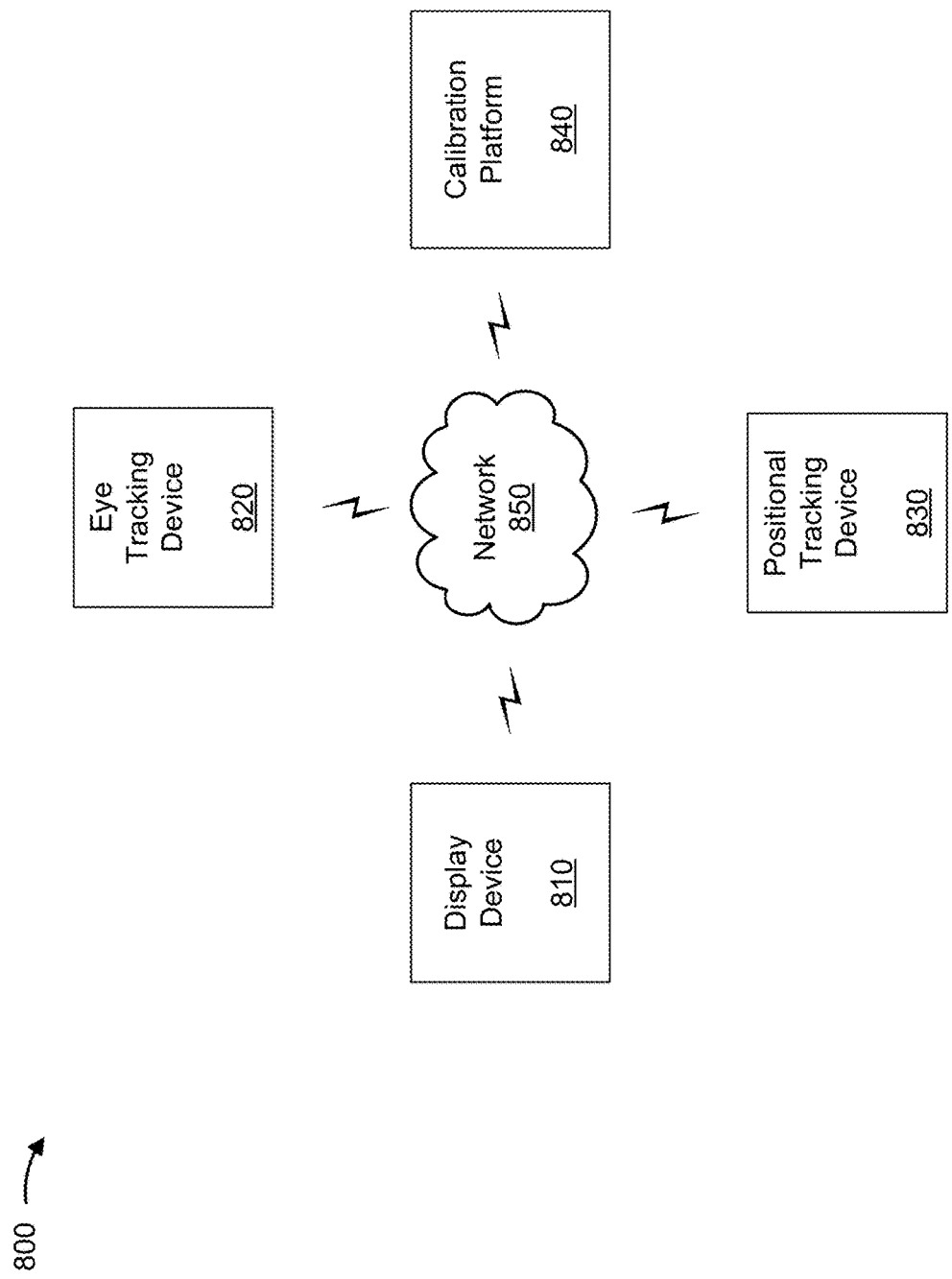
FIG. 8 is a diagram of an example environment in which systems and/or methods described herein may be implemented.

FIG. 8 is a diagram of an example environment 800 in which systems and/or methods described herein may be implemented. As shown in FIG. 8, environment 800 may include a display device 810, an eye tracking device 820, a positional tracking device 830, a calibration platform 840, and a network 850. Devices of environment 800 may interconnect via wired connections, wireless connections, or a combination of wired and wireless connections.

Display device 810 includes any display that is capable of presenting imaging provided by calibration platform 840. Display device 810 may include technologies such as liquid crystal display (LCDs) devices, light-emitting diode (LED) display devices, plasma display devices, wearable display devices (e.g., head-mounted display devices), handheld display devices, and/or the like. For example, in some implementations, display device 810 may include or be part of a wearable display device such as an optical see-through head-mounted display (OST-HMD) device, a video see-through head-mounted display (VST-HMD) device, and/or the like. Additionally, or alternatively, display device 810 may be a non-wearable display device, such as a handheld computer, a tablet computer, and/or the like. In some implementations, display device 810 may be a stereoscopic or three-dimensional display device.

Eye tracking device 820 includes one or more devices capable of receiving, generating, processing, and/or providing information related to a gaze of a user. For example, eye tracking device 820 may include one or more projectors that create a pattern of infrared or near-infrared light on a user's eyes and one or more cameras that capture high-resolution images of the user's eyes and the pattern created thereon. In some implementations, eye tracking device 820 may employ one or more algorithms (e.g., machine learning algorithms, image processing algorithms, mathematical algorithms, and/or the like) to determine a position and gaze point of the user's eyes. Furthermore, in some implementations, the high-resolution images of the user's eyes and the pattern created thereon may be used to detect blink information (e.g., where the user closes one or more eyes). In some implementations, eye tracking device 820 may be configured to track the information related to the gaze of the user and provide the tracked gaze information to display device 810, positional tracking device 830, and/or calibration platform 840.

Positional tracking device 830 includes one or more devices capable of receiving, generating, processing, and/or providing information related to a position (e.g., three-dimensional coordinates) of one or more real-world objects. For example, positional tracking device 830 may be a head-anchored tracking device that can perform "inside-out" positional tracking (e.g., a front-facing camera embedded in display device 810, a camera and/or other sensors rigidly mounted on display device 810, and/or the like). Additionally, or alternatively, positional tracking device 830 may be a world-anchored tracking device that can perform "outside-in" positional tracking (e.g., a reflective markers tracking device, an electromagnetic tracking device, a projective light-based tracking device, and/or the like). In some implementations, positional tracking device 830 may be configured to track three-dimensional coordinates of real-world objects (e.g., display device 810, a calibration object, and/or the like) and provide the tracked three-dimensional coordinates to display device 810 and/or calibration platform 840.

Calibration platform 840 includes one or more devices capable of receiving, generating, storing, processing, and/or providing information associated with augmented reality imaging, mixed reality imaging, a position (e.g., a pose) of one or more real-world objects (e.g., a calibration object), and/or the like. For example, calibration platform 840 may include an image processing system of display device 810, an external image processing computing device connected to display device 810 (e.g., via a peripheral cable, via network 850, and/or the like), an image processing platform implemented in a cloud computing environment, and/or the like. In some implementations, calibration platform 840 may provide output to display device 810 for display. In some implementations, calibration platform 840 may compute a transformation function that provides a mapping between three-dimensional points in a real-world coordinate system and points used for generating a three-dimensional virtual scene based on measurements gathered using positional tracking device 830. In some implementations, the measurements may be gathered using positional tracking device 830 based on information tracked by eye tracking device 820 indicating that a user performed a voluntary blink.

Network 850 includes one or more wired and/or wireless networks. For example, network 850 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a personal area network (PAN), a body area network (BAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these and/or other types of networks.

The number and arrangement of devices and networks shown in FIG. 8 are provided as one or more examples. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
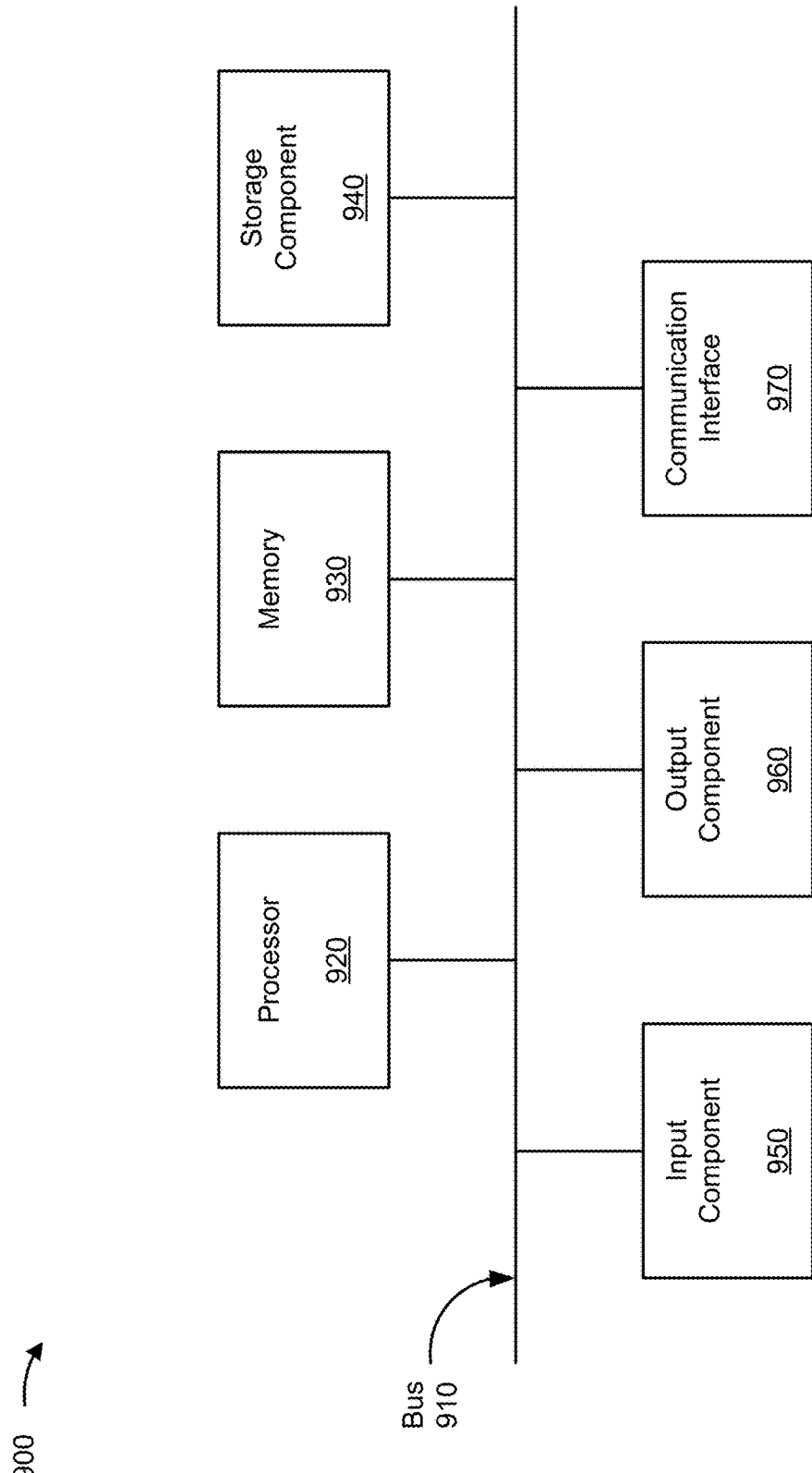
FIG. 9 is a diagram of example components of one or more devices of FIG. 8.

FIG. 9 is a diagram of example components of a device 900. Device 900 may correspond to display device 810, eye tracking device 820, positional tracking device 830, and/or calibration platform 840. In some implementations, display device 810, eye tracking device 820, positional tracking device 830, and/or calibration platform 840 may include one or more devices 900 and/or one or more components of device 900. As shown in FIG. 9, device 900 may include a bus 910, a processor 920, a memory 930, a storage component 940, an input component 950, an output component 960, and a communication interface 970.

Bus 910 includes a component that permits communication among multiple components of device 900. Processor 920 is implemented in hardware, firmware, and/or a combination of hardware and software. Processor 920 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random-access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 950 includes a component that permits device 900 to receive information, such as via user input (e.g., a touch screen display, a keyboard, a keypad, a mouse, a button, a switch, and/or a microphone). Additionally, or alternatively, input component 950 may include a component for determining location (e.g., a global positioning system (GPS) component) and/or a sensor (e.g., an accelerometer, a gyroscope, an actuator, another type of positional or environmental sensor, and/or the like). Output component 960 includes a component that provides output information from device 900 (via, e.g., a display, a speaker, a haptic feedback component, an audio or visual indicator, and/or the like).

Communication interface 970 includes a transceiver-like component (e.g., a transceiver, a separate receiver, a separate transmitter, and/or the like) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, and/or the like.

Device 900 may perform one or more processes described herein. Device 900 may perform these processes based on processor 920 executing software instructions stored by a non-transitory computer-readable medium, such as memory 930 and/or storage component 940. As used herein, the term "computer-readable medium" refers to a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

Figure 10:
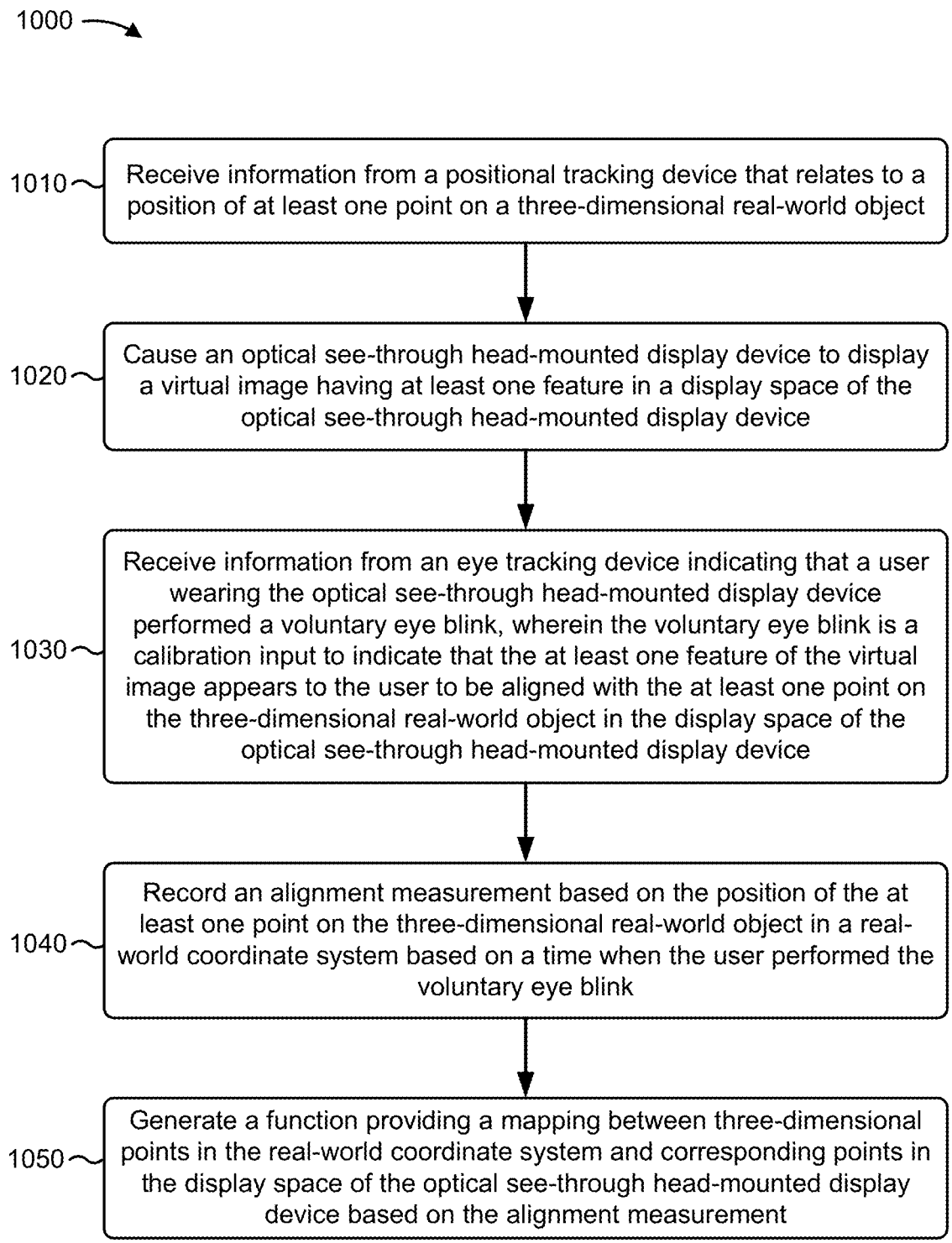
FIGS. 10-12 are flow charts of example processes for blink-based calibration of an optical see-through head-mounted display device.

FIG. 10 is a flow chart of an example process 1000 for blink-based calibration of an optical see-through head-mounted display device. In some implementations, one or more process blocks of FIG. 10 may be performed by a calibration platform (e.g., calibration platform 840). In some implementations, one or more process blocks of FIG. 10 may be performed by another device or a group of devices separate from or including the calibration platform, such as a display device (e.g., display device 810), an eye tracking device (e.g., eye tracking device 820), a positional tracking device (e.g., positional tracking device 830), and/or the like.

As shown in FIG. 10, process 1000 may include receiving information from a positional tracking device that relates to a position of at least one point on a three-dimensional real-world object (block 1010). For example, the calibration platform (e.g., using a processor 920, a memory 930, a storage component 940, an input component 950, an output component 960, a communication interface 970, and/or the like) may receive information from a positional tracking device that relates to a position of at least one point on a three-dimensional real-world object, as described above.

As further shown in FIG. 10, process 1000 may include causing an optical see-through head-mounted display device to display a virtual image having at least one feature in a display space of the optical see-through head-mounted display device (block 1020). For example, the calibration platform (e.g., using a processor 920, a memory 930, a storage component 940, an input component 950, an output component 960, a communication interface 970, and/or the like) may cause an optical see-through head-mounted display device to display a virtual image having at least one feature in a display space of the optical see-through head-mounted display device, as described above.

As further shown in FIG. 10, process 1000 may include receiving information from an eye tracking device indicating that a user wearing the optical see-through head-mounted display device performed a voluntary eye blink, wherein the voluntary eye blink is a calibration input to indicate that the at least one feature of the virtual image appears to the user to be aligned with the at least one point on the three-dimensional real-world object in the display space of the optical see-through head-mounted display device (block 1030). For example, the calibration platform (e.g., using a processor 920, a memory 930, a storage component 940, an input component 950, an output component 960, a communication interface 970, and/or the like) may receive information from an eye tracking device indicating that a user wearing the optical see-through head-mounted display device performed a voluntary eye blink, as described above. In some implementations, the voluntary eye blink may be a calibration input to indicate that the at least one feature of the virtual image appears to the user to be aligned with the at least one point on the three-dimensional real-world object in the display space of the optical see-through head-mounted display device.

As further shown in FIG. 10, process 1000 may include recording an alignment measurement based on the position of the at least one point on the three-dimensional real-world object in a real-world coordinate system based on a time when the user performed the voluntary eye blink (block 1040). For example, the calibration platform (e.g., using a processor 920, a memory 930, a storage component 940, an input component 950, an output component 960, a communication interface 970, and/or the like) may record an alignment measurement based on the position of the at least one point on the three-dimensional real-world object in a real-world coordinate system based on a time when the user performed the voluntary eye blink, as described above.

As further shown in FIG. 10, process 1000 may include generating a function providing a mapping between three-dimensional points in the real-world coordinate system and corresponding points in the display space of the optical see-through head-mounted display device based on the alignment measurement (block 1050). For example, the calibration platform (e.g., using a processor 920, a memory 930, a storage component 940, an input component 950, an output component 960, a communication interface 970, and/or the like) may generate a function providing a mapping between three-dimensional points in the real-world coordinate system and corresponding points in the display space of the optical see-through head-mounted display device based on the alignment measurement, as described above.

Process 1000 may include additional implementations, such as any single implementation or any combination of implementations described below and/or in connection with one or more other processes described elsewhere herein.

In some implementations, the voluntary eye blink may be detected based on the information received from the eye tracking device indicating that the user wearing the optical see-through head-mounted display device closed one or more eyes for a duration that satisfies a threshold value and/or that the user wearing the optical see-through head-mounted display device closed one or more eyes according to a pattern. For example, in some implementations, the pattern may comprise multiple eye blinks that occur within a threshold time of one another, a sequence in which the user closes a first eye while a second eye is open and subsequently closes the second eye while the first eye is open, and/or the like. Additionally, or alternatively, the voluntary eye blink may be detected using one or more machine learning models that are trained to determine whether gaze information indicates that an eye blink is voluntary, spontaneous, or reflex.

In some implementations, the function may define a relationship between the three-dimensional points in the real-world coordinate system and corresponding three-dimensional points in the display space of the optical see-through head-mounted display device. Additionally, or alternatively, the function may define a relationship between the three-dimensional points in the real-world coordinate system and corresponding two-dimensional points on a screen of the optical see-through head-mounted display device.

In some implementations, the function providing the mapping between the three-dimensional points in the real-world coordinate system and the corresponding points in the display space of the optical see-through head-mounted display device may be generated based on a Single-Point Active Alignment Method (SPAAM) technique, a Multi-Point Active Alignment Method (MPAAM) technique, and/or the like.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
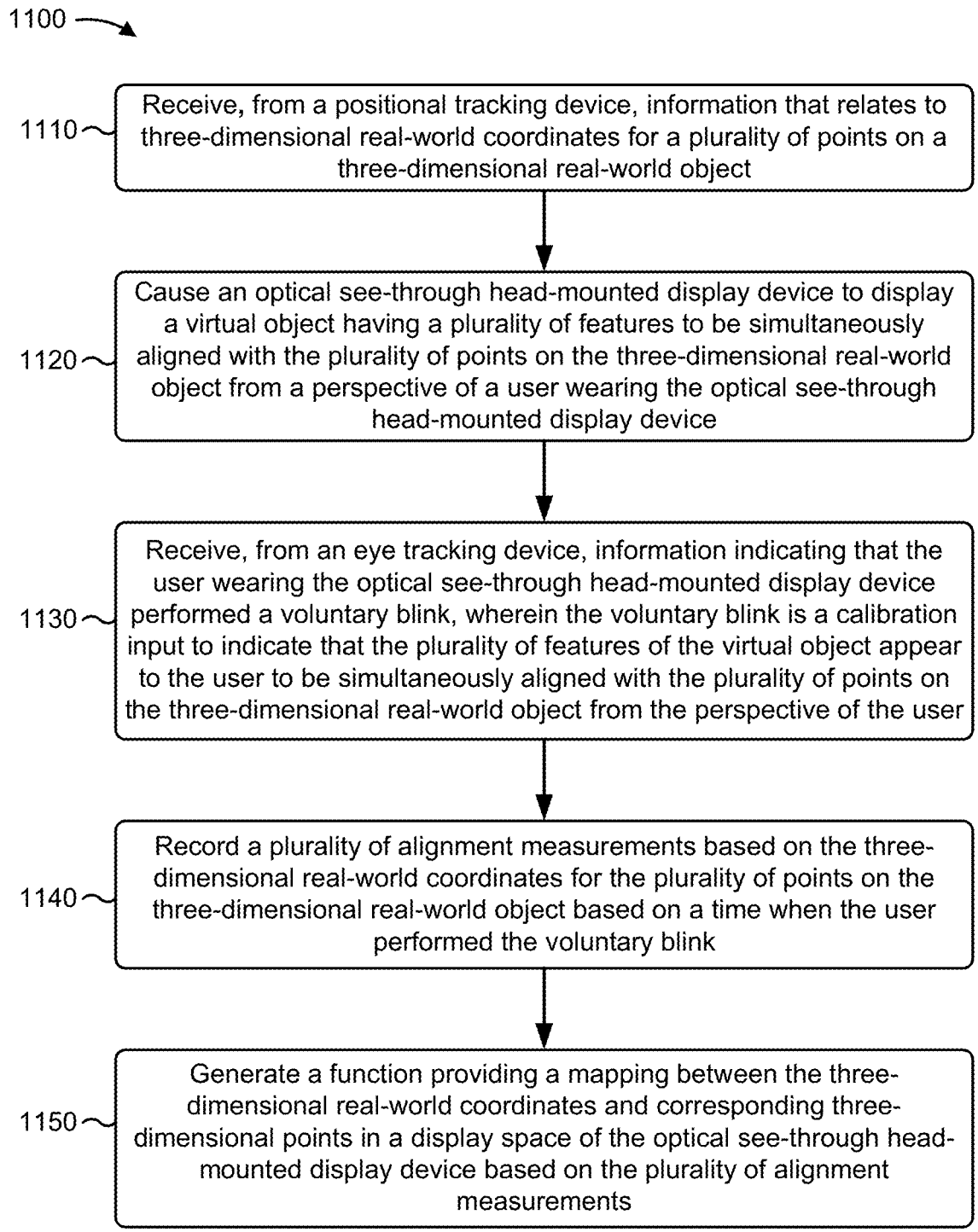

FIG. 11 is a flow chart of an example process 1100 for blink-based calibration of an optical see-through head-mounted display device. In some implementations, one or more process blocks of FIG. 11 may be performed by a calibration platform (e.g., calibration platform 840). In some implementations, one or more process blocks of FIG. 11 may be performed by another device or a group of devices separate from or including the calibration platform, such as a display device (e.g., display device 810), an eye tracking device (e.g., eye tracking device 820), a positional tracking device (e.g., positional tracking device 830), and/or the like.

As shown in FIG. 11, process 1100 may include receiving, from a positional tracking device, information that relates to three-dimensional real-world coordinates for a plurality of points on a three-dimensional real-world object (block 1110). For example, the calibration platform (e.g., using a processor 920, a memory 930, a storage component 940, an input component 950, an output component 960, a communication interface 970, and/or the like) may receive, from a positional tracking device, information that relates to three-dimensional real-world coordinates for a plurality of points on a three-dimensional real-world object, as described above.

As further shown in FIG. 11, process 1100 may include causing an optical see-through head-mounted display device to display a virtual object having a plurality of features to be simultaneously aligned with the plurality of points on the three-dimensional real-world object from a perspective of a user wearing the optical see-through head-mounted display device (block 1120). For example, the calibration platform (e.g., using a processor 920, a memory 930, a storage component 940, an input component 950, an output component 960, a communication interface 970, and/or the like) may cause an optical see-through head-mounted display device to display a virtual object having a plurality of features to be simultaneously aligned with the plurality of points on the three-dimensional real-world object from a perspective of a user wearing the optical see-through head-mounted display device, as described above.

As further shown in FIG. 11, process 1100 may include receiving, from an eye tracking device, information indicating that the user wearing the optical see-through head-mounted display device performed a voluntary blink, wherein the voluntary blink is a calibration input to indicate that the plurality of features of the virtual object appear to the user to be simultaneously aligned with the plurality of points on the three-dimensional real-world object from the perspective of the user (block 1130). For example, the calibration platform (e.g., using a processor 920, a memory 930, a storage component 940, an input component 950, an output component 960, a communication interface 970, and/or the like) may receive, from an eye tracking device, information indicating that the user wearing the optical see-through head-mounted display device performed a voluntary blink, as described above. In some implementations, the voluntary blink may be a calibration input to indicate that the plurality of features of the virtual object appear to the user to be simultaneously aligned with the plurality of points on the three-dimensional real-world object from the perspective of the user.

As further shown in FIG. 11, process 1100 may include recording a plurality of alignment measurements based on the three-dimensional real-world coordinates for the plurality of points on the three-dimensional real-world object based on a time when the user performed the voluntary blink (block 1140). For example, the calibration platform (e.g., using a processor 920, a memory 930, a storage component 940, an input component 950, an output component 960, a communication interface 970, and/or the like) may record a plurality of alignment measurements based on the three-dimensional real-world coordinates for the plurality of points on the three-dimensional real-world object based on a time when the user performed the voluntary blink, as described above.

As further shown in FIG. 11, process 1100 may include generating a function providing a mapping between the three-dimensional real-world coordinates and corresponding three-dimensional points in a display space of the optical see-through head-mounted display device based on the plurality of alignment measurements (block 1150). For example, the calibration platform (e.g., using a processor 920, a memory 930, a storage component 940, an input component 950, an output component 960, a communication interface 970, and/or the like) may generate a function providing a mapping between the three-dimensional real-world coordinates and corresponding three-dimensional points in a display space of the optical see-through head-mounted display device based on the plurality of alignment measurements, as described above.

Process 1100 may include additional implementations, such as any single implementation or any combination of implementations described below and/or in connection with one or more other processes described elsewhere herein.

In some implementations, the voluntary blink may be detected based on the information received from the eye tracking device indicating that the user wearing the optical see-through head-mounted display device closed one or more eyes for a duration that satisfies a threshold value, that the user wearing the optical see-through head-mounted display device performed multiple blinks at a frequency that satisfies a threshold value, and/or that the user wearing the optical see-through head-mounted display device closed a first eye while a second eye was open and subsequently closed the second eye while the first eye was open. Additionally, or alternatively, the voluntary blink may be detected using one or more machine learning models that are trained to determine whether gaze information indicates that an eye blink is voluntary, spontaneous, or reflex.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
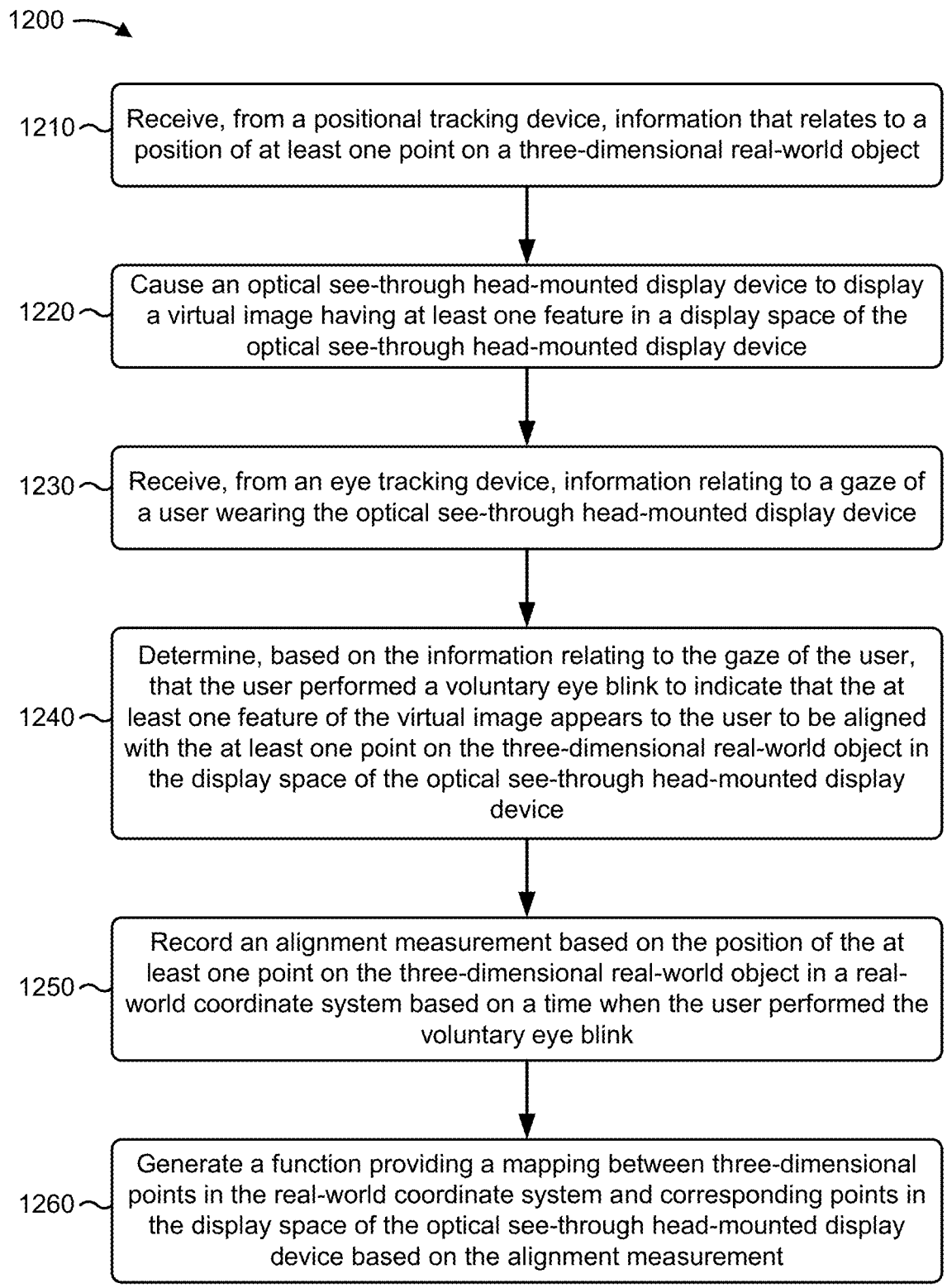

FIG. 12 is a flow chart of an example process 1200 for blink-based calibration of an optical see-through head-mounted display device. In some implementations, one or more process blocks of FIG. 12 may be performed by a calibration platform (e.g., calibration platform 840). In some implementations, one or more process blocks of FIG. 12 may be performed by another device or a group of devices separate from or including the calibration platform, such as a display device (e.g., display device 810), an eye tracking device (e.g., eye tracking device 820), a positional tracking device (e.g., positional tracking device 830), and/or the like.

As shown in FIG. 12, process 1200 may include receiving, from a positional tracking device, information that relates to a position of at least one point on a three-dimensional real-world object (block 1210). For example, the calibration platform (e.g., using a processor 920, a memory 930, a storage component 940, an input component 950, an output component 960, a communication interface 970, and/or the like) may receive, from a positional tracking device, information that relates to a position of at least one point on a three-dimensional real-world object, as described above.

As further shown in FIG. 12, process 1200 may include causing an optical see-through head-mounted display device to display a virtual image having at least one feature in a display space of the optical see-through head-mounted display device (block 1220). For example, the calibration platform (e.g., using a processor 920, a memory 930, a storage component 940, an input component 950, an output component 960, a communication interface 970, and/or the like) may cause an optical see-through head-mounted display device to display a virtual image having at least one feature in a display space of the optical see-through head-mounted display device, as described above.

As further shown in FIG. 12, process 1200 may include receiving, from an eye tracking device, information relating to a gaze of a user wearing the optical see-through head-mounted display device (block 1230). For example, the calibration platform (e.g., using a processor 920, a memory 930, a storage component 940, an input component 950, an output component 960, a communication interface 970, and/or the like) may receive, from an eye tracking device, information relating to a gaze of a user wearing the optical see-through head-mounted display device, as described above.

As further shown in FIG. 12, process 1200 may include determining, based on the information relating to the gaze of the user, that the user performed a voluntary eye blink to indicate that the at least one feature of the virtual image appears to the user to be aligned with the at least one point on the three-dimensional real-world object in the display space of the optical see-through head-mounted display device (block 1240). For example, the calibration platform (e.g., using a processor 920, a memory 930, a storage component 940, an input component 950, an output component 960, a communication interface 970, and/or the like) may determine, based on the information relating to the gaze of the user, that the user performed a voluntary eye blink to indicate that the at least one feature of the virtual image appears to the user to be aligned with the at least one point on the three-dimensional real-world object in the display space of the optical see-through head-mounted display device, as described above.

As further shown in FIG. 12, process 1200 may include recording an alignment measurement based on the position of the at least one point on the three-dimensional real-world object in a real-world coordinate system based on a time when the user performed the voluntary eye blink (block 1250). For example, the calibration platform (e.g., using a processor 920, a memory 930, a storage component 940, an input component 950, an output component 960, a communication interface 970, and/or the like) may record an alignment measurement based on the position of the at least one point on the three-dimensional real-world object in a real-world coordinate system based on a time when the user performed the voluntary eye blink, as described above.

As further shown in FIG. 12, process 1200 may include generating a function providing a mapping between three-dimensional points in the real-world coordinate system and corresponding points in the display space of the optical see-through head-mounted display device based on the alignment measurement (block 1260). For example, the calibration platform (e.g., using a processor 920, a memory 930, a storage component 940, an input component 950, an output component 960, a communication interface 970, and/or the like) may generate a function providing a mapping between three-dimensional points in the real-world coordinate system and corresponding points in the display space of the optical see-through head-mounted display device based on the alignment measurement, as described above.

Process 1200 may include additional implementations, such as any single implementation or any combination of implementations described below and/or in connection with one or more other processes described elsewhere herein.

In some implementations, the voluntary eye blink may be detected based on the information received from the eye tracking device indicating that the user wearing the optical see-through head-mounted display device closed one or more eyes for a duration that satisfies a threshold value, that the user blinked multiple times at a frequency that satisfies a threshold value, and/or that the user closed one or more eyes according to a particular pattern. Additionally, or alternatively, the voluntary eye blink may be detected using one or more machine learning models.

Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, at a calibration device, information from a positional tracking device that relates to a position of at least one point on a three-dimensional real-world object;
causing, by the calibration device, an optical see-through head-mounted display device to display a virtual image having at least one feature in a display space of the optical see-through head-mounted display device;
receiving, at the calibration device, information from an eye tracking device indicating that a user wearing the optical see-through head-mounted display device performed a voluntary eye blink,
wherein the voluntary eye blink is a calibration input to indicate that the at least one feature of the virtual image appears to the user to be aligned with the at least one point on the three-dimensional real-world object in the display space of the optical see-through head-mounted display device;
determining, by the calibration device and using one or more machine learning models, whether a blink, associated with the information from the eye tracking device, is voluntary, spontaneous, or reflexive based on using a peak velocity and a particular duration associated with the blink,
wherein the one or more machine learning models are trained to use information associated with the virtual image and historical information associated with historical blink frequencies and durations for spontaneous blinks and reflex blinks to determine whether the blink is voluntary, spontaneous, or reflexive,
wherein the information includes one or more of:
information associated with a manner in which the virtual image is displayed, or
user information;
recording, by the calibration device, an alignment measurement based on the position of the at least one point on the three-dimensional real-world object in a real-world coordinate system based on a threshold amount of time before or after the user performed the voluntary eye blink,
wherein recording the alignment measurement is based on using the one or more machine learning models to determine whether the blink is voluntary, spontaneous, or reflexive; and
generating, by the calibration device, a function providing a mapping between three-dimensional points in the real-world coordinate system and corresponding points in the display space of the optical see-through head-mounted display device based on the alignment measurement.

2. The method of claim 1, further comprising:
detecting the voluntary eye blink based on the information received from the eye tracking device indicating that the user wearing the optical see-through head-mounted display device closed one or more eyes for a duration that satisfies a threshold value.

3. The method of claim 1, further comprising:
detecting the voluntary eye blink based on the information received from the eye tracking device indicating that the user wearing the optical see-through head-mounted display device closed one or more eyes according to a pattern.

4. The method of claim 3, wherein the pattern comprises multiple eye blinks that occur within a threshold time of one another.

5. The method of claim 3, wherein the pattern comprises a sequence in which the user closes a first eye while a second eye is open and subsequently closes the second eye while the first eye is open.

6. The method of claim 1, wherein the generated function defines a relationship between the three-dimensional points in the real-world coordinate system and corresponding three-dimensional points in the display space of the optical see-through head-mounted display device.

7. The method of claim 1, wherein the generated function defines a relationship between the three-dimensional points in the real-world coordinate system and corresponding two-dimensional points on a screen of the optical see-through head-mounted display device.

8. The method of claim 1, wherein the calibration device generates the function providing the mapping between the three-dimensional points in the real-world coordinate system and the corresponding points in the display space of the optical see-through head-mounted display device based on a Single-Point Active Alignment Method (SPAAM) technique.

9. The method of claim 1, wherein the calibration device generates the function providing the mapping between the three-dimensional points in the real-world coordinate system and the corresponding points in the display space of the optical see-through head-mounted display device based on a Multi-Point Active Alignment Method (MPAAM) technique.

10. The method of claim 1, wherein the one or more machine learning models determine whether the blink is voluntary, spontaneous, or reflexive based on a number of repetitions associated with entering the calibration input.

11. A calibration device, comprising:
a memory; and
one or more processors, communicatively coupled to the memory, to:
receive, from a positional tracking device, information that relates to three-dimensional real-world coordinates for a plurality of points on a three-dimensional real-world object;
cause an optical see-through head-mounted display device to display a virtual object having a plurality of features to be simultaneously aligned with the plurality of points on the three-dimensional real-world object from a perspective of a user wearing the optical see-through head-mounted display device;
receive, from an eye tracking device, information indicating that the user wearing the optical see-through head-mounted display device performed a voluntary blink,
wherein the voluntary blink is a calibration input to indicate that the plurality of features of the virtual object appear to the user to be simultaneously aligned with the plurality of points on the three-dimensional real-world object from the perspective of the user;
determine, using one or more machine learning models, whether a blink, associated with the information from the eye tracking device, is voluntary, spontaneous, or reflexive based on using a peak velocity and a particular duration associated with the blink,
wherein the one or more machine learning models are trained to use information associated with the virtual object and historical information associated with historical blink frequencies and durations for spontaneous blinks and reflex blinks to determine whether the blink is voluntary, spontaneous, or reflexive,
wherein the information includes one or more of:
information associated with a manner in which a virtual image is displayed, or
user information;
record a plurality of alignment measurements based on the three-dimensional real-world coordinates for the plurality of points on the three-dimensional real-world object based on a time when the user performed the voluntary blink,
wherein the one or more processors, to record the plurality of alignment measurements are configured to record the plurality of alignment measurements based on using the one or more machine learning models to determine whether the blink is voluntary, spontaneous, or reflexive; and
generate a function providing a mapping between the three-dimensional real-world coordinates and corresponding three-dimensional points in a display space of the optical see-through head-mounted display device based on the plurality of alignment measurements.

12. The calibration device of claim 11, wherein the one or more processors are further to:
detect the voluntary blink based on the information received from the eye tracking device indicating that the user wearing the optical see-through head-mounted display device closed one or more eyes for a duration that satisfies a threshold value.

13. The calibration device of claim 11, wherein the one or more processors are further to:
detect the voluntary blink based on the information received from the eye tracking device indicating that the user wearing the optical see-through head-mounted display device performed multiple blinks at a frequency that satisfies a threshold value.

14. The calibration device of claim 11, wherein the one or more processors are further to:
detect the voluntary blink based on the information received from the eye tracking device indicating that the user wearing the optical see-through head-mounted display device closed a first eye while a second eye was open and subsequently closed the second eye while the first eye was open.

15. The calibration device of claim 11, wherein the one or more machine learning models determine whether the blink is voluntary, spontaneous, or reflexive based on one or more parameters relating to an environment associated with the calibration input.

16. A non-transitory computer-readable medium storing instructions comprising:
one or more instructions that, when executed by one or more processors, cause the one or more processors to:
receive, from a positional tracking device, information that relates to a position of at least one point on a three-dimensional real-world object;
cause an optical see-through head-mounted display device to display a virtual image having at least one feature in a display space of the optical see-through head-mounted display device;
receive, from an eye tracking device, information relating to a gaze of a user wearing the optical see-through head-mounted display device;
determine, based on the information relating to the gaze of the user, that the user performed a voluntary eye blink to indicate that the at least one feature of the virtual image appears to the user to be aligned with the at least one point on the three-dimensional real-world object in the display space of the optical see-through head-mounted display device;
determine, using one or more machine learning models, whether a blink, associated with the information from the eye tracking device, is voluntary, spontaneous, or reflexive based on using a peak velocity and a particular duration associated with the,
wherein the one or more machine learning models are trained to use information associated with the virtual image and historical information associated with historical blink frequencies and durations for spontaneous blinks and reflex blinks to determine whether the blink is voluntary, spontaneous, or reflexive;
record an alignment measurement based on the position of the at least one point on the three-dimensional real-world object in a real-world coordinate system based on a time when the user performed the voluntary eye blink; and
generate a function providing a mapping between three-dimensional points in the real-world coordinate system and corresponding points in the display space of the optical see-through head-mounted display device based on the alignment measurement.

17. The non-transitory computer-readable medium of claim 16, wherein the one or more instructions cause the one or more processors to determine that the user performed the voluntary eye blink based on the information received from the eye tracking device indicating that the user wearing the optical see-through head-mounted display device closed one or more eyes for a duration that satisfies a threshold value.

18. The non-transitory computer-readable medium of claim 16, wherein the one or more instructions cause the one or more processors to determine that the user performed the voluntary eye blink based on the information received from the eye tracking device indicating that the user wearing the optical see-through head-mounted display device blinked multiple times at a frequency that satisfies a threshold value.

19. The non-transitory computer-readable medium of claim 16, wherein the one or more instructions cause the one or more processors to determine that the user performed the voluntary eye blink based on the information received from the eye tracking device indicating that the user wearing the optical see-through head-mounted display device closed one or more eyes according to a particular pattern.

20. The non-transitory computer-readable medium of claim 16, wherein the one or more machine learning models are configured to discard information associated with the blink based a manner in which the virtual image is displayed.

* * * * *